(12) United States Patent
Zeine et al.

(10) Patent No.: US 10,559,982 B2
(45) Date of Patent: Feb. 11, 2020

(54) EFFICIENT ANTENNAS CONFIGURATIONS FOR USE IN WIRELESS COMMUNICATIONS AND WIRELESS POWER TRANSMISSION SYSTEMS

(71) Applicant: Ossia Inc., Bellevue, WA (US)

(72) Inventors: Hatem Zeine, Bellevue, WA (US); Siamak Ebadi, Bellevue, WA (US); Douglas Wayne Williams, Bellevue, WA (US)

(73) Assignee: Ossia Inc., Bellevue, WA (US)

( * ) Notice: Subject to any disclaimer, the term of this patent is extended or adjusted under 35 U.S.C. 154(b) by 546 days.

(21) Appl. No.: 15/179,860

(22) Filed: Jun. 10, 2016

(65) Prior Publication Data
US 2016/0365754 A1    Dec. 15, 2016

Related U.S. Application Data
(60) Provisional application No. 62/173,891, filed on Jun. 10, 2015.

(51) Int. Cl.
*H02J 50/20*    (2016.01)
*H02J 7/02*    (2016.01)

(52) U.S. Cl.
CPC .............. *H02J 50/20* (2016.02); *H02J 7/025* (2013.01)

(58) Field of Classification Search
CPC ....................................................... H02J 50/20
See application file for complete search history.

(56) References Cited

U.S. PATENT DOCUMENTS

| | | | | | |
|---|---|---|---|---|---|
| 4,789,423 | A | * | 12/1988 | Pelligrino | H05K 3/205 216/18 |
| 5,613,225 | A | * | 3/1997 | Charas | H01Q 21/0087 455/103 |
| 6,020,853 | A | * | 2/2000 | Richards | H01Q 1/38 343/700 MS |
| 6,480,171 | B1 | * | 11/2002 | Huang | H01Q 1/38 343/700 MS |
| 6,496,149 | B1 | * | 12/2002 | Birnbaum | H01Q 9/0407 343/700 MS |
| 7,791,552 | B1 | * | 9/2010 | Romanofsky | H01Q 15/148 343/700 MS |
| 9,203,158 | B2 | * | 12/2015 | Alexopoulos | H01Q 15/0006 |
| 2001/0050654 | A1 | * | 12/2001 | Killen | H01Q 9/285 343/817 |
| 2003/0036713 | A1 | * | 2/2003 | Bouton | A61B 5/05 600/587 |
| 2004/0174301 | A1 | * | 9/2004 | Aisenbrey | H01Q 9/0407 343/700 MS |
| 2006/0164317 | A1 | * | 7/2006 | Hughes | H01Q 1/523 343/841 |
| 2007/0285314 | A1 | * | 12/2007 | Mortazawi | H01Q 1/3233 342/375 |

(Continued)

*Primary Examiner* — Jared Fureman
*Assistant Examiner* — James P Evans

(57) ABSTRACT

Various techniques are described herein for efficiently transmitting and receiving wireless power and/or data signals. In one example, a transmitter includes multiple antennas, a dielectric material in proximity to the multiple antennas, and multiple scattering elements embedded in the dielectric material. One or more of the multiple scattering elements are configured to be excited by one or more signals emitted by the multiple antennas.

20 Claims, 19 Drawing Sheets

(56) References Cited

U.S. PATENT DOCUMENTS

| | | | | |
|---|---|---|---|---|
| 2014/0227985 A1* | 8/2014 | Sanford | ............ | H01Q 21/0087 |
| | | | | 455/90.3 |
| 2014/0266917 A1* | 9/2014 | De Luis | ............... | H01Q 19/005 |
| | | | | 343/700 MS |
| 2015/0070230 A1* | 3/2015 | Bradley | ................. | H01Q 19/06 |
| | | | | 343/753 |
| 2015/0077302 A1* | 3/2015 | Alfano | .................... | H01Q 7/08 |
| | | | | 343/788 |
| 2015/0194730 A1* | 7/2015 | Sudo | ...................... | H01Q 9/045 |
| | | | | 343/905 |
| 2015/0357713 A1* | 12/2015 | Griffith | ................ | G02B 6/4225 |
| | | | | 343/720 |

* cited by examiner $$D \begin{array}{c} A \\ \begin{bmatrix} 1 & 0 & 0 & 0 & 0 & . & . & 0 \\ 0 & 1 & 0 & 0 & 0 & . & . & 0 \\ 0 & 0 & 1 & 0 & 0 & . & . & 0 \\ 0 & 0 & 0 & 1 & 0 & . & . & 0 \\ 0 & 0 & 0 & 0 & 1 & . & . & 0 \\ . & . & . & . & . & . & . & 0 \\ . & . & . & . & . & . & . & 0 \\ 0 & 0 & 0 & 0 & 0 & . & . & 1 \end{bmatrix} \end{array}$$

|      |      |     |   |   |     |
|------|------|-----|---|---|-----|
| 1.1  | 0    | 2   | . | . | 7   |
| 5    | 3.4  | 9   | . | . | 0   |
| 0    | 13   | 2   | . | . | 9   |
| 5.8  | 6    | 0   | . | . | 19  |
| 1.3  | 2    | 23  | . | . | 7   |
| .    | .    | .   | . | . | 12  |
| .    | .    | .   | . | . | 17  |
| 5.9  | 17.4 | 0.5 | . | . | 1.9 |

*FIG. 15*

EFFICIENT ANTENNAS CONFIGURATIONS FOR USE IN WIRELESS COMMUNICATIONS AND WIRELESS POWER TRANSMISSION SYSTEMS

RELATED APPLICATIONS

This application claims priority to U.S. Provisional Application No. 62/173,891, filed Jun. 10, 2015, which is hereby incorporated by reference in its entirety.

TECHNICAL FIELD

The technology described herein relates generally to the field of wireless communication and power transmission and, more specifically, techniques to allow a wireless system to send/receive wireless power and/or data signals more efficiently.

BACKGROUND

A wireless power transmission system typically comprises a transmitter (antenna array), which has a large number of antennas for wireless power/data signal delivery. The length of the antenna transmission lines inside a large antenna array transmitter may negatively affect the system performance due to a high level of noise created by these transmission lines. In addition, when a large number of antennas are volumetrically arranged in a small space, the transmission lines to the antennas may become a mesh that limits or stops signals from moving freely to/from the antennas. Efficient spatial arrangements of a large number of antennas in a small volume may negatively impact functional characteristics of the wireless power transmission system, such as antenna polarization diversity, relative radio frequency (RF) transparency, etc. Thus, the number of antennas that can be efficiently included within a particular volume may be limited.

These problems may be further complicated by the fact that the exact nature of an incoming RF wave front may be non-deterministic in terms of angle, direction, polarization, etc. Effectively feeding (routing traces to) antennas in a variety of polarizations/orientations while maintaining good isolation characteristics and minimizing RF obstructions within a three-dimensional space may be a challenging task.

Typically, wireless RF power transmission systems have different set ups and tuning algorithms. Each has its advantages and disadvantages, yet the RF wireless power transmission systems known in the art may not provide a relatively fast tuning with the client(s) while maintaining sufficient power signal delivery and low noise level. This may be due to blockage and/or out of phase summation of multipath received signals at the transmitter antenna. These issues may result in insufficient power levels delivered to a client.

Additionally, reducing the physical size of individual antenna elements may require antenna boards be constructed of special high dielectric/low loss materials. These materials tend to be very costly.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

FIG. 14 is an example matrix illustrating the correspondence between driven and active emitting elements in a transmitter;

FIG. 15 is another example matrix illustrating the correspondence between driven and active emitting elements in a transmitter, according to an embodiment;

DETAILED DESCRIPTION

Figure 1:
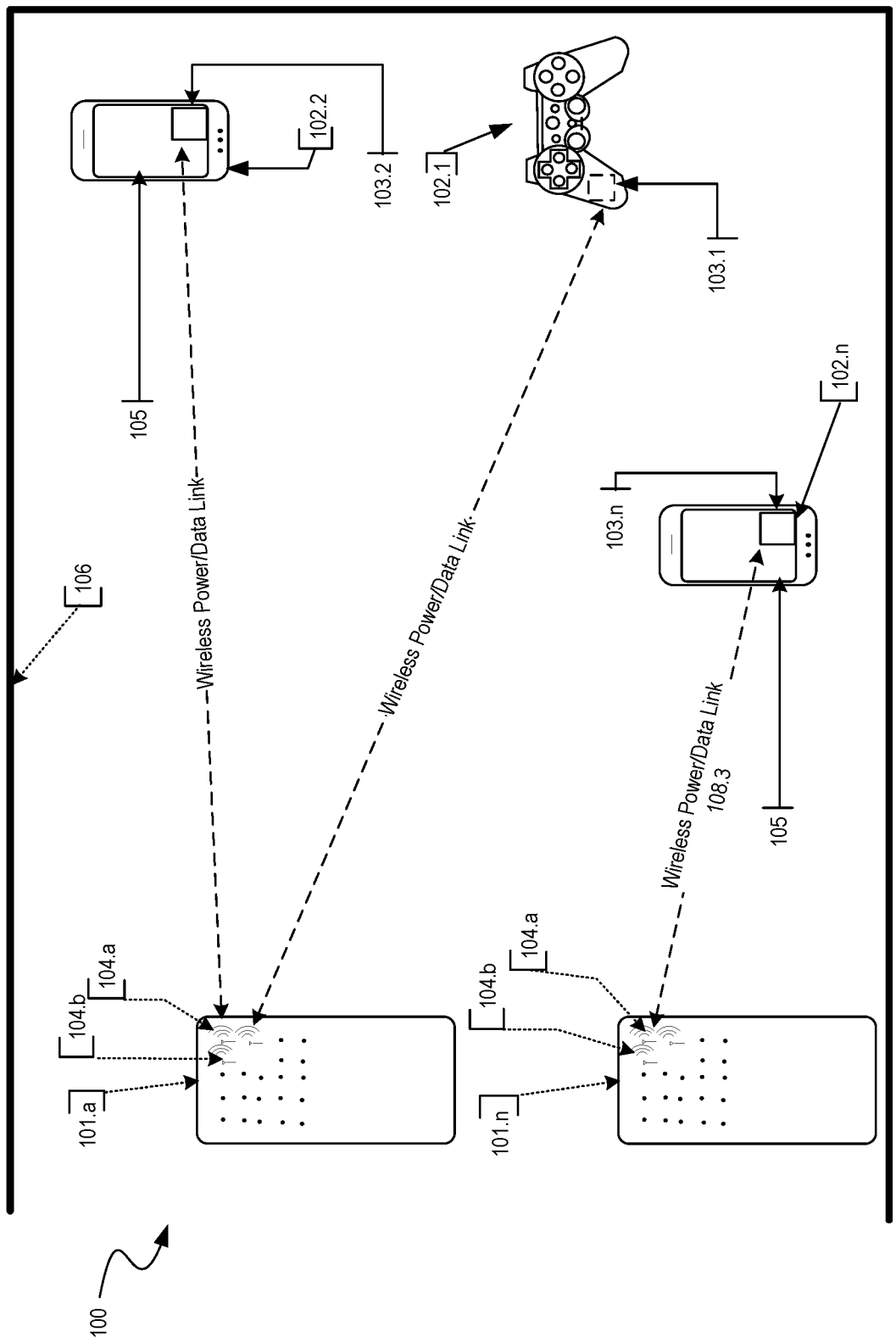
FIG. 1 is a diagram illustrating an example environment depicting wireless power delivery from transmitters to various wireless receivers, according to an embodiment.

The following description and drawings are illustrative and are not to be construed as limiting. Numerous specific details are described to provide a thorough understanding of the disclosure. However, in certain instances, well-known or conventional details are not described in order to avoid obscuring the description. References to "one" or "an" embodiment in the present disclosure can be, but not necessarily are, references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art within the context of the disclosure and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, and no special significance is meant when a term is elaborated upon herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of the reader, and in no way limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure describe various techniques for wirelessly charging and/or wireless power delivery from one or more transmitters to one or more wireless devices (also referred to herein as "devices" or "target devices") having embedded, attached, and/or integrated power receiver clients (also referred to herein as "wireless power receivers" or "clients").

The techniques described herein utilize wireless technologies to deliver power, data or both. In some embodiments, power, data, or both, may be delivered simultaneously as a continuous complex waveform, as a pulsed waveform, as multiple overlapping waveforms, or combinations or variations thereof. The power and data may be delivered using the same or different wireless technologies.

The wireless technologies described herein may apply to not only electromagnetic (EM) waves, but also to sound waves, and/or other forms of periodic excitations (e.g., phonons). EM waves may include radio waves, microwaves, infrared radiation, visible light, ultraviolet radiation, X-rays, and/or gamma rays. Sound waves may include infrasound waves, acoustic waves, and/or ultrasound waves. The techniques described herein may simultaneously utilize multiple wireless technologies and/or multiple frequency spectrums within a wireless technology to deliver the power, data or both.

The wireless technologies may include dedicated hardware components to deliver power and/or data. The dedicated hardware components may be modified based on the wireless technology, or combination of wireless technologies, being utilized. For example, when applied to sound waves, the system employs microphones and speakers rather than antennas.

System Overview/Architecture

FIG. 1 is a diagram illustrating an example wireless communication/power delivery environment 100 depicting wireless power delivery from one or more wireless transmitters 101 to various wireless devices 102 within the wireless communication/power delivery environment. More specifically, FIG. 1 illustrates an example wireless power delivery environment 100 in which wireless power and/or data can be delivered to available wireless devices 102.1-102.n having one or more power receiver clients 103.1-103.n (also referred to herein as "wireless power receivers" or "wireless power clients"). The wireless power receivers are configured to receive wireless power from one or more wireless transmitters 101.

As shown in the example of FIG. 1, the wireless devices 102.1-102.n are mobile phone devices 102.2 and 102.n, respectively, and a wireless game controller 102.1, although the wireless devices 102.1-102.n can be any (smart or dumb) wireless device or system that needs power and is capable of receiving wireless power via one or more integrated power receiver clients 103.1-103.n. Smart devices are electronic devices that can communicate (e.g., using WiFi) and transmit beacon signals. Dumb devices are electronic device are passive devices that may not communication (e.g., no Bluetooth or Wifi capability) and may not transmit a beacon signal. As discussed herein, the one or more integrated power receiver clients or "wireless power receivers" receive and process power from one or more transmitters/transmitters 101.a-101.n and provide the power to the wireless devices 102.1-102.n for operation thereof.

Each transmitter 101 (also referred to herein as a "charger", "array of antennas" or "antenna array system") can include multiple antennas 104, e.g., an antenna array including hundreds or thousands of spaced-apart antennas, that are each capable of delivering wireless power to wireless devices 102. Each transmitter 101 may also deliver wireless communication signals to wireless devices 102. In some embodiments, the wireless power and wireless communication signals may be delivered as a combined power/communication signal. Indeed, while the detailed description provided herein focuses on wirelessly transmitting power, aspects of the invention are equally applicable to wirelessly transmitting data.

In some embodiments, the antennas are adaptively-phased radio frequency antennas and the transmitter 101 utilizes a novel phase shifting algorithm as described in one or more of U.S. Pat. Nos. 8,558,661, 8,159,364, 8,410,953, 8,446, 248, 8,854,176, U.S. patent application Ser. Nos. 14/461,332 and 14/815,893. The transmitter 101 is capable of determining the appropriate phases to deliver a coherent power transmission signal to the power receiver clients 103. The array is configured to emit a signal (e.g., continuous wave or pulsed power transmission signal) from multiple antennas at a specific phase relative to each other.

Additionally, the transmitter 101 may include a time delayed retro-directive radio frequency (RF) holographic array that delivers wireless RF power that matches the client antenna patterns in three dimensional (3D) space (polarization, shape & power levels of each lobe). It is appreciated that use of the term "array" does not necessarily limit the antenna array to any specific array structure. That is, the antenna array does not need to be structured in a specific "array" form or geometry. Furthermore, as used herein the term "array" or "array system" may be used include, related and peripheral circuitry for signal generation, reception and transmission, such as radios, digital logic and modems.

The wireless devices 102 can include one or more power receiver clients 103 (also known as a "wireless power receiver"). As illustrated in the example of FIG. 1, power delivery antennas 104a and data communication antennas 104b are shown. The power delivery antennas 104a are configured to provide delivery of wireless radio frequency power in the wireless power delivery environment. The data communication antennas are configured to send data communications to, and receive data communications from, the power receiver clients 103.1-103 and/or the wireless devices 102.1-102.n. In some embodiments, the data communication antennas can communicate via Bluetooth™, WiFi, ZigBee™, or other wireless communication protocols.

Each power receiver client 103.1-103.n includes one or more antennas (not shown) for receiving signals from the transmitters 101. Likewise, each transmitter 101.a-101.n includes an antenna array having one or more antennas and/or sets of antennas capable of emitting continuous wave signals at specific phases relative to each other. As discussed above, each array is capable of determining the appropriate phases for delivering coherent signals to the power receiver clients 102.1-102.n. For example, coherent signals can be determined by computing the complex conjugate of a received beacon signal at each antenna of the array such that the coherent signal is properly phased for the particular power receiver client that transmitted the beacon signal. The beacon signal, which is primarily referred to herein as a continuous waveform can alternatively or additionally take the form of a modulated signal.

Although not illustrated, each component of the environment, e.g., wireless power receiver, transmitter, etc, can include control and synchronization mechanisms, such as a data communication synchronization module. The transmitters 101.a-101.n are connected to a power source such as, for example, a power outlet or source connecting the transmitters to a standard or primary alternating current (AC) power supply in a building. Alternatively or additionally, one or more of the transmitters 101.a-101.n can be powered by a battery or via other power providing mechanism.

In some embodiments, the power receiver clients 102.1-102.n and/or the transmitters 101.a-101.n utilize or encounter reflective objects 106 such as, for example, walls or other RF reflective obstructions within range to beacon and deliver and/or receive wireless power and/or data within the wireless power delivery environment. The reflective objects 106 can be utilized for multi-directional signal communication regardless of whether a blocking object is in the line of sight between the transmitter and the power receiver client.

As described herein, each wireless device 102.1-102.n can be any system and/or device, and/or any combination of devices/systems that can establish a connection with another device, a server and/or or other systems within the example environment 100. In some embodiments, the wireless devices 102.1-102.n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a battery or component coupled to a battery, a PDA etc. The wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lodes/handles, electric light switch controllers, electric shavers, etc.

Although not illustrated in the example of FIG. 1, the transmitter 101 and the power receiver clients 103.1-103.n can each include a data communication module for communication via a data channel. Alternatively or additionally, the power receiver clients 103.1-103.n can direct the wireless devices 102.1-102.n to communicate with the transmitter via existing data communications modules.

Figure 2:
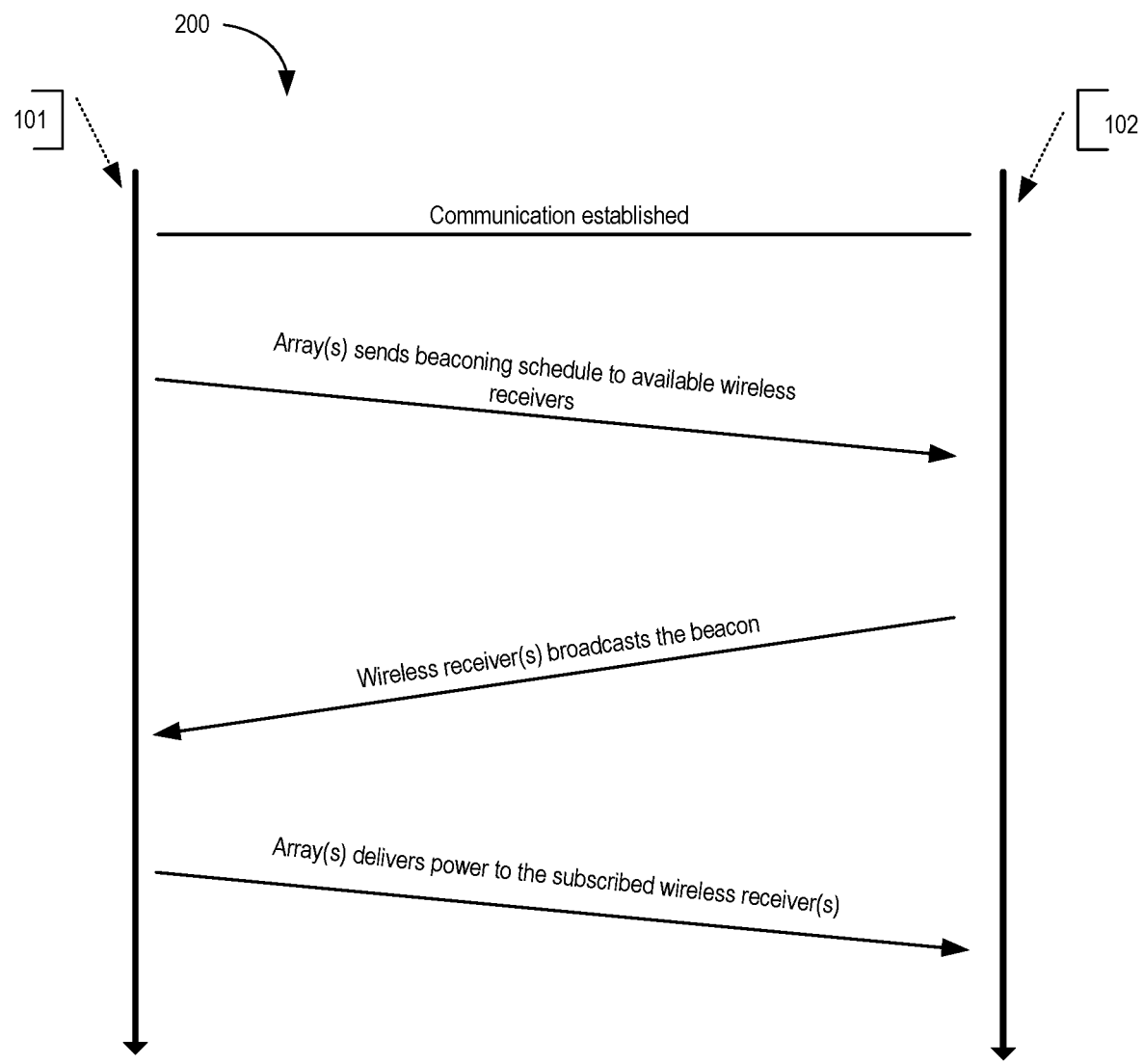
FIG. 2 is a sequence diagram illustrating example operations between a wireless transmitter and a wireless receiver client for commencing wireless power delivery, according to an embodiment.

FIG. 2 is a sequence diagram 200 illustrating example operations between a wireless transmitter 101 and a power receiver client 103 for commencing wireless power delivery, according to an embodiment. Initially, communication is established between the transmitter 101 and the power receiver client 103, such as communicate via Bluetooth™, WiFi, ZigBee™, or other wireless communication protocols. The transmitter 101 subsequently sends a beaconing schedule to the power receiver client 103 to arrange beacon broadcasting and RF power/data delivery schedules with this and any other power receiver clients. Based on the schedule, the power receiver client 103 broadcasts the beacon. As shown, the transmitter 101 receives the beacon from the power receiver client 103 and detects the phase (or direction) at which the beacon signal was received. The transmitter 101 then delivers wireless power and/or data to the power receiver client 103 based the phase (or direction) of the received beacon. That is, the transmitter 101 determines the complex conjugate of the phase and uses the complex conjugate to deliver power to the power receiver client 103 in the same direction in which the beacon signal was received from the power receiver client 103.

In some embodiments, the transmitter 101 includes many antennas; one or more of which are used to deliver power to the power receiver client 103. The transmitter 101 can detect phases of the beacon signals that are received at each antenna. The large number of antennas may result in different beacon signals being received at each antenna of the transmitter 101. The transmitter may then utilize the algorithm or process described in one or more of U.S. Pat. Nos. 8,558,661, 8,159,364, 8,410,953, 8,446,248, 8,854,176, and U.S. Provisional Patent Application Nos. 62/146,233 and 62/163,964. The algorithm or process determines how to emit signals from one or more antennas that takes into account the effects of the large number of antennas in the transmitter 101. In other words, the algorithm determines how to emit signals from one or more antennas in such a way as to create an aggregate signal from the transmitter 101 that approximately recreates the waveform of the beacon, but in the opposite direction.

Figure 3:
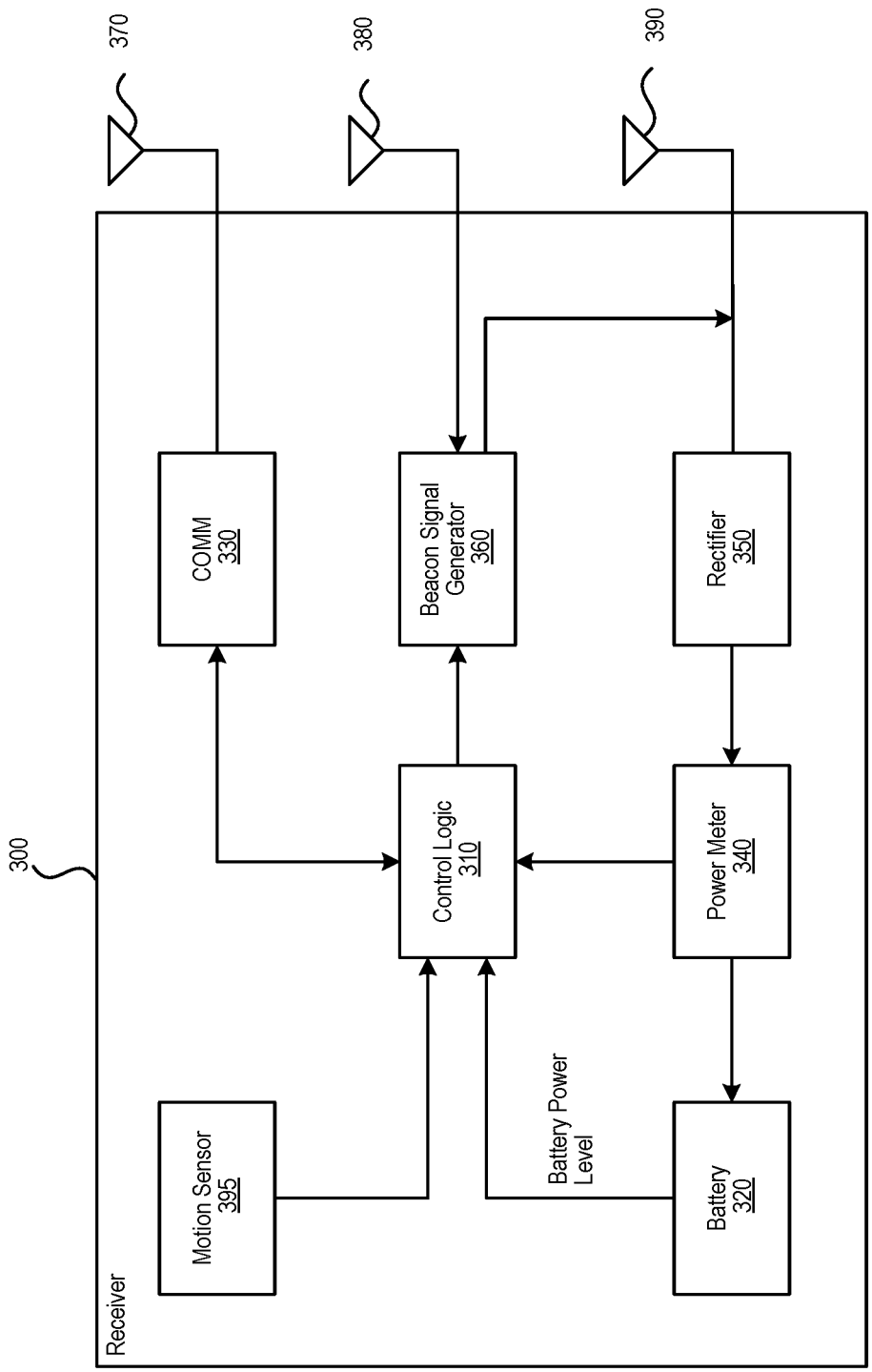
FIG. 3 is a block diagram illustrating an example wireless power receiver (client) in accordance with an embodiment.

FIG. 3 is a block diagram illustrating an example receiver 300 in accordance with an embodiment. The receiver 300 includes various components including control logic 310, battery 320, communication block 330 and associated antenna 370, power meter 340, rectifier 350, beacon signal generator 360 and an associated antenna 380, and switch 365 connecting the rectifier 350 or the beacon signal generator 360 to an associated antenna 390. Some or all of the components can be omitted in some embodiments. Additional or fewer components are also possible.

The rectifier 350 receives (via one or more client antennas) the power transmission signal from the power transmitter, which is fed through the power meter 340 to the battery 320 for charging. The power meter 340 measures the total received power signal strength and provides the control logic 310 with this measurement. The control logic 310 also may receive the battery power level from the battery 320 itself or receive battery power data from, e.g. an API of an operating system running on the receiver 300. The control logic 310 may also transmit/receive via the communication block 330 a data signal on a data carrier frequency, such as the base signal clock for clock synchronization. The beacon signal generator 360 transmits the beacon signal, or calibration signal, using either the antenna 380 or 390. It may be noted that, although the battery 320 is shown for being charged and for providing power to the receiver 300, the receiver may also receive its power directly from the rectifier 350. This may be in addition to the rectifier 350 providing charging current to the battery 320, or in lieu of providing charging. Also, it may be noted that the use of multiple antennas is one example of implementation and the structure may be reduced to one shared antenna, where the receiver multiplexes signal reception/transmission.

An optional motion sensor 395 detects motion and signals the control logic 310. For example, when a device is receiving power at high frequencies above 500 MHz, its location may become a hotspot of (incoming) radiation. So when the device is on a person, the level of radiation may exceed a regulation or exceed acceptable radiation levels set by medical/industrial authorities. To avoid any over-radiation issue, the device may integrate motion detection mechanisms such as accelerometers, assisted GPS, or other mechanisms. Once the device detects that it is in motion, the disclosed system assumes that it is being handled by a user, and signals the power transmitting array either to stop transmitting power to it, or to lower the received power to an acceptable fraction of the power. In cases where the device is used in a moving environment like a car, train or plane, the power might only be transmitted intermittently or at a reduced level unless the device is close to losing all available power.

Figure 4:
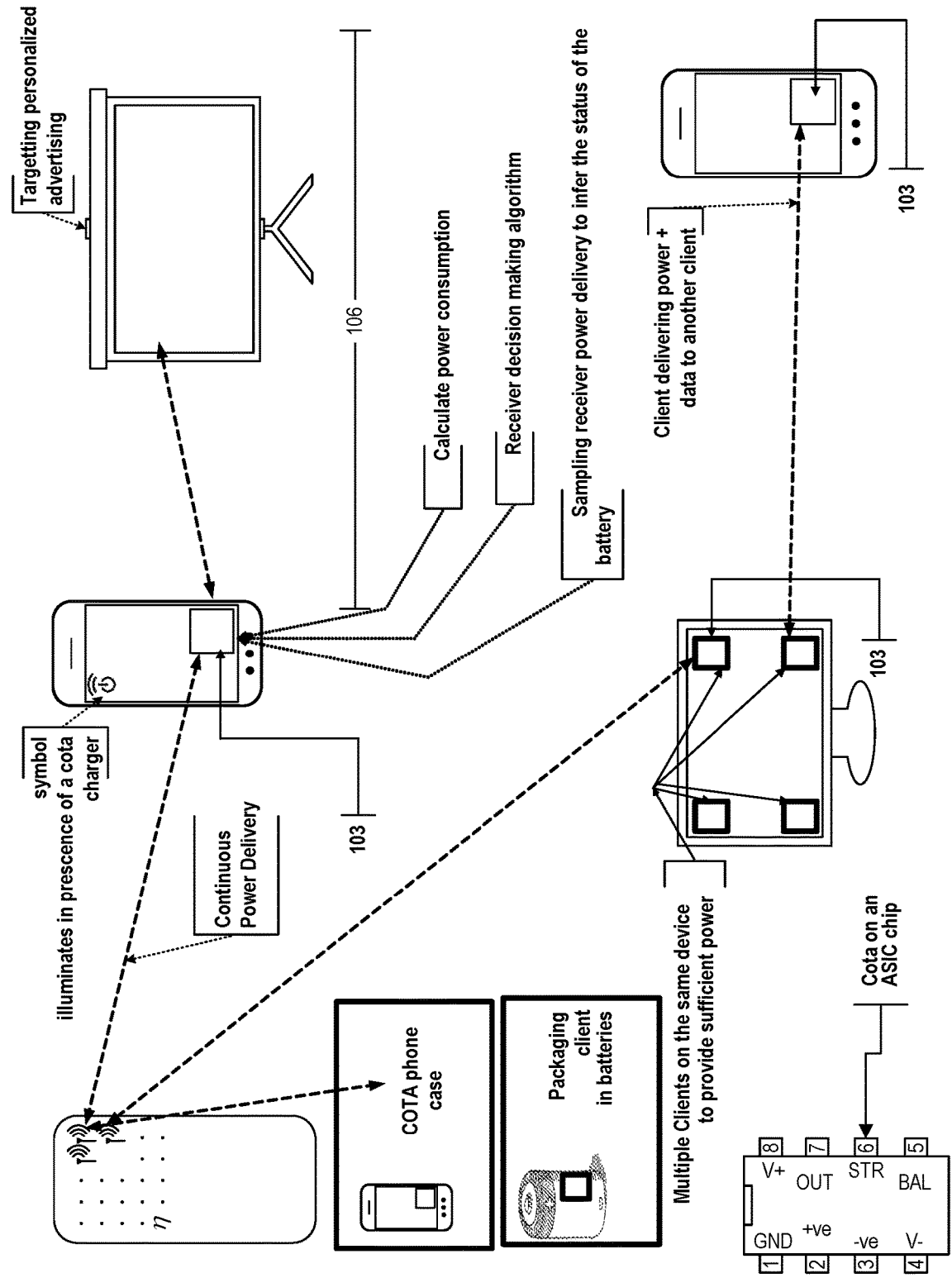
FIG. 4 is a system overview diagram illustrating various components of the various embodiments described herein.

FIG. 4 is a system overview diagram illustrating various embodiments and components possible, though other combinations and variations are possible. As shown, among other features, in some embodiments, the wireless power receiver can be in a form of an application specific integrated circuit (ASIC) chip, a mobile phone case, in a display device (e.g. computer monitor or television, which in turn may relay power to a nearby power receiver client 103), packaged within a standard battery form factor (e.g. AA battery), etc.

Efficient Wireless Transmission System

A wireless transmission system, such as one for transmitting power as described in reference to FIG. 1, comprises a standalone or discrete wireless transmitter unit. (The system is described below in the context of wireless charging, but applies to other contexts, like location and motion detection, communication, etc.) These wireless power transmission systems perform optimally when the antennas are spatially diverse (e.g., antenna distributed over a large surface area) and not in a single plane. Unfortunately, standalone or discrete wireless transmitter units can only be so large without becoming unsightly and/or otherwise unwieldy.

In one embodiment, a wireless transmission system is designed to include high dielectric elements and a reduced form factor. The high dielectric wireless transmission system can include various plates (or antenna elements) that collectively include thousands of antennas. The placement of the antennas and the scattering elements in the system allow a reduction in the form factor (or physical size) of the wireless transmission system.

Embodiments of the present disclosure describe various techniques for including more antennas within a small area, for avoiding the above drawbacks, and for improving the efficiency of a transmitter, by including multiple scattering elements in the spaces between antennas. The scattering elements effectively act as additional antenna elements, thus increasing the number of antenna elements per volume. The techniques described herein allow the antennas to receive signals more evenly and create diverse signal paths from and to the transmitter antennas. In some embodiments, a small desktop transmitter device containing many antenna elements in a three-dimensional arrangement is capable of capturing a large amount of incident RF energy and directing RF energy out of the full three-dimensional volume of the device. The complexities of the three-dimensional volume are divided between separate components—printed circuit boards (PCBs) including the antennas, and dielectric spacer materials including the scattering elements. The PCBs and dielectric spacer materials are assembled together in such a way as to achieve the overall desired system characteristics.

The basic operations of the systems and methods described relate to an RF wave front incident to a transmitter device entering the dielectric spacer structure, where the wave front's energy is scattered into the device in a complex manner, allowing the antennas on the PCBs to receive a better signal strength. These signals are then broadcast back out through the transmitter device to re-create the original waveform towards the client.

Returning to FIG. 1, the beacon signal that arrives at the transmitter 101 may be a combination of a large number of signal paths that arrive at the transmitter 101 via different lanes. For example, the beacon may be scattered by different obstacles, such as walls, ceilings, and objects in the room. The different signal paths may add in a way that the summation of the signals may cancel each other at the transmitter 101. Increasing the randomness in the transmitter 101 may prevent signals that travel different paths from cancelling each other.

The present disclosure describes several techniques for increasing the randomness in the transmitter 101, such as randomized scattering elements, randomized polarizations, and randomized sizes and locations of the components within the transmitter 101. In general, the techniques described herein allow geometries within the transmitter 101 to not be repeated in a periodic way, which improves the signal-to-noise ratio and provides immunity to cancellation, cross polarization isolation, detuning, etc.

Furthermore, with a conventional transmitter, a signal arriving at the surface may be absorbed or accepted by antennas at or near the transmitter's surface. But then the area inside the conventional transmitter may be blocked by the antennas which are on the surface. The increased randomness of the transmitter 101 described herein allows the signals at the surface to be redistributed throughout the volume of the transmitter 101, such that the entire volume of the transmitter is more evenly illuminated or excited. In other words, a conventional transmitter may have a specific area in the volume where signals arriving in that area are out of phase and destructively combine, so that area in the volume would not be useful because it does not accept any energy. By increasing the randomness in the transmitter 101, the chance of such situations occurring is minimized and the full volume of the transmitter 101 becomes more useful.

In some embodiments, the transmitter 101 includes many antennas and scattering elements. The scattering elements act as the randomizing elements that create more diversity in received and emitted signals. The transmitter 101 detects the magnitude and phase of the beacon signals that are received at each antenna. The large number of antennas and scattering elements result in different beacon signals being received at each antenna of the transmitter 101. The transmitter then determines the complex conjugate of the beacon signals received at each antenna. Using the complex conjugates, each antenna then emits a signal having a phase and amplitude that takes into account the effects of the large number of antennas and scattering elements in the transmitter 101. In other words, the transmitter 101 emits signals from each antenna in such a way as to create an aggregate signal from all of the antennas and scattering elements that approximately recreates, the waveform of the beacon in the opposite direction. This will include both phase and amplitude of the complex signal. In this way, the antennas and scattering elements do not need to be controlled individually. Instead, the antennas and scattering elements are controlled in bulk. The scattering elements will automatically selectively couple to signals from antennas that are advantageous to recreating the waveform of the beacon. The antennas and scattering elements create a three-dimensional antenna array that allows for more efficient signal entry and exit from the transmitter 101.

In some examples, the beacon signal is polarized, such as with circular or linear polarization. A conventional receiver may have antennas with a polarization in the same direction as the transmitter. However, due to reflections and scattering from the environment, the wave that arrives at the transmitter 101 may have a significantly different polarization than what is expected by the receiver. To overcome this problem, in some embodiments, the elements in the volume of the transmitter 101 is randomized in terms of polarization itself. This allows the transmitter 101 to accept polarizations in many directions and/or rotations. For example, a large number of antennas at different polarization angles may be present within the volume of the transmitter 101. This allows the transmitter 101 to mitigate cases where a signal polarized in the X direction is expected, but the received signal is polarized in the Y direction. Furthermore, the randomization of the polarization may decrease the chance of cancellation of signals. The different polarization angles within the transmitter 101 also allow the transmitter 101 to recreate an outgoing signal with any polarization, such as circular or linear.

Other components or aspects of the transmitter 101 may also be randomized to decrease the chance of cancellation of signals. For example, the sizes and locations of the antennas may be randomized, in addition or alternate to randomizing the polarizations. The gain and or resonant frequencies of the antenna elements may also be randomized.

In some embodiments, the frequency at which the received signals are sampled may be increased above the Nyquist frequency. In a conventional antenna array, the antennas are spaced a half wavelength apart, and the received signals are sampled at the Nyquist frequency (i.e., two times the frequency of the wave). This is because the conventional antenna array is designed to operate in free space and is not expecting to operate with complicated wave fronts corresponding to a multipath environment. The conventional system would receive no beam-forming and/or spatial focusing benefit from spacing antennas closer than half a wavelength, due to the Nyquist sampling frequency. However, in the present disclosure, the sampling frequency may be increased above the Nyquist frequency so that the randomized received signals are better captured. In addition, the antennas may be spaced randomly, including at spaces less than half a wavelength, in order to increase the chances of the antennas receiving complex, multi-path signals.

Figure 5:
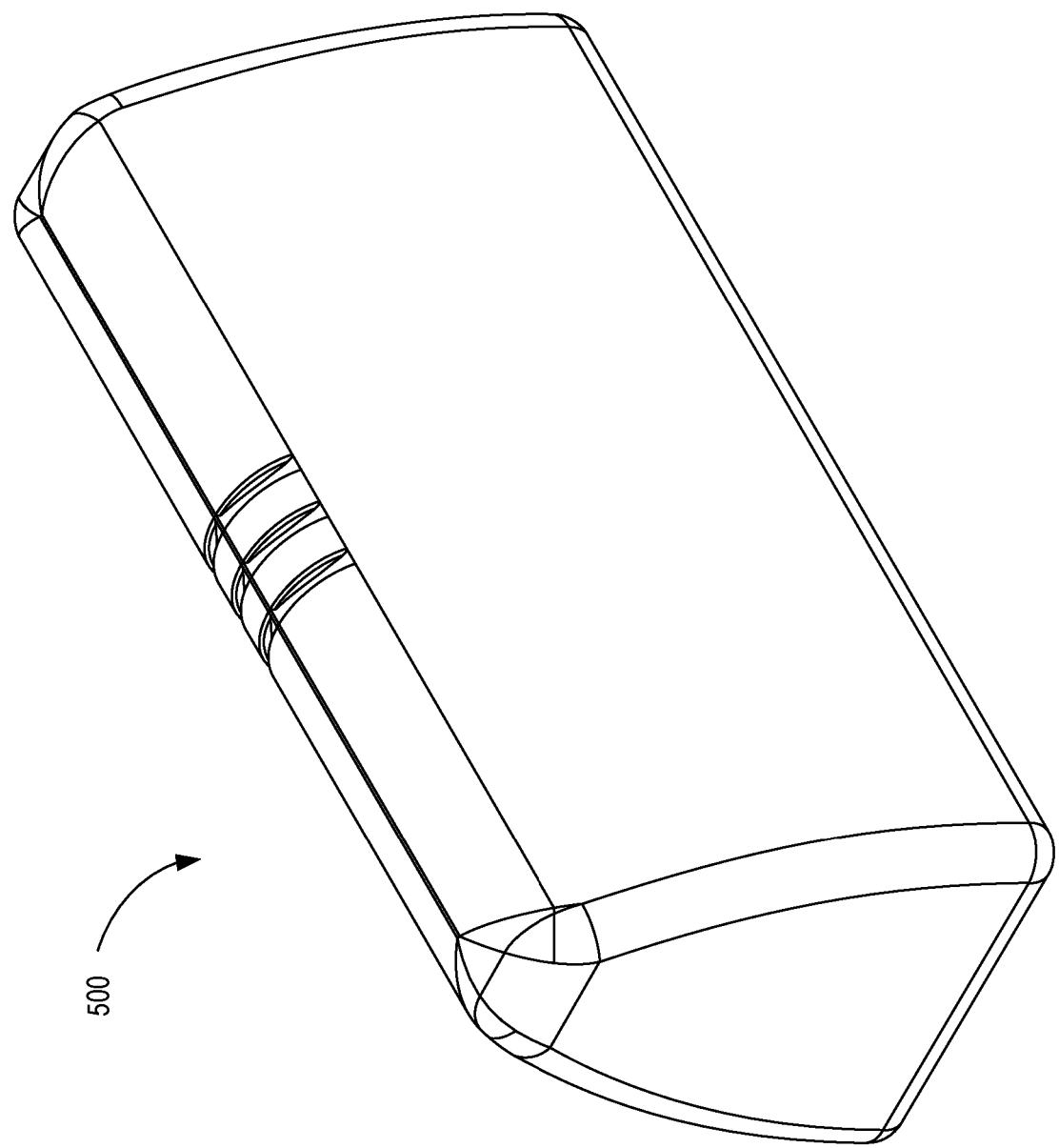
FIG. 5 is an example design of a transmitter, according to an embodiment.

FIG. 5 is an example design of an exterior of a transmitter 500, according to an embodiment. The transmitter 500 may be an example of one or more of the transmitters 101 described with reference to FIGS. 1 and 2. The transmitter 500 includes many antennas and scattering elements for delivering power to a client. The scattering elements effectively act as additional radiating antenna elements to allow the transmitter 500 to have a larger number of emitting elements per volume. Because the scattering elements are free-floating and do not have wire leads, the typical problems with a large number of antennas per volume are mitigated.

In some examples, the transmitter 500 may be portable. The portable transmitter 500 receives beacon signals and transmit power/data signals without being plugged in to a power outlet. The power transmitted by the portable transmitter 500 may be provided by batteries, solar panels, or other portable power generating techniques.

Figure 6:
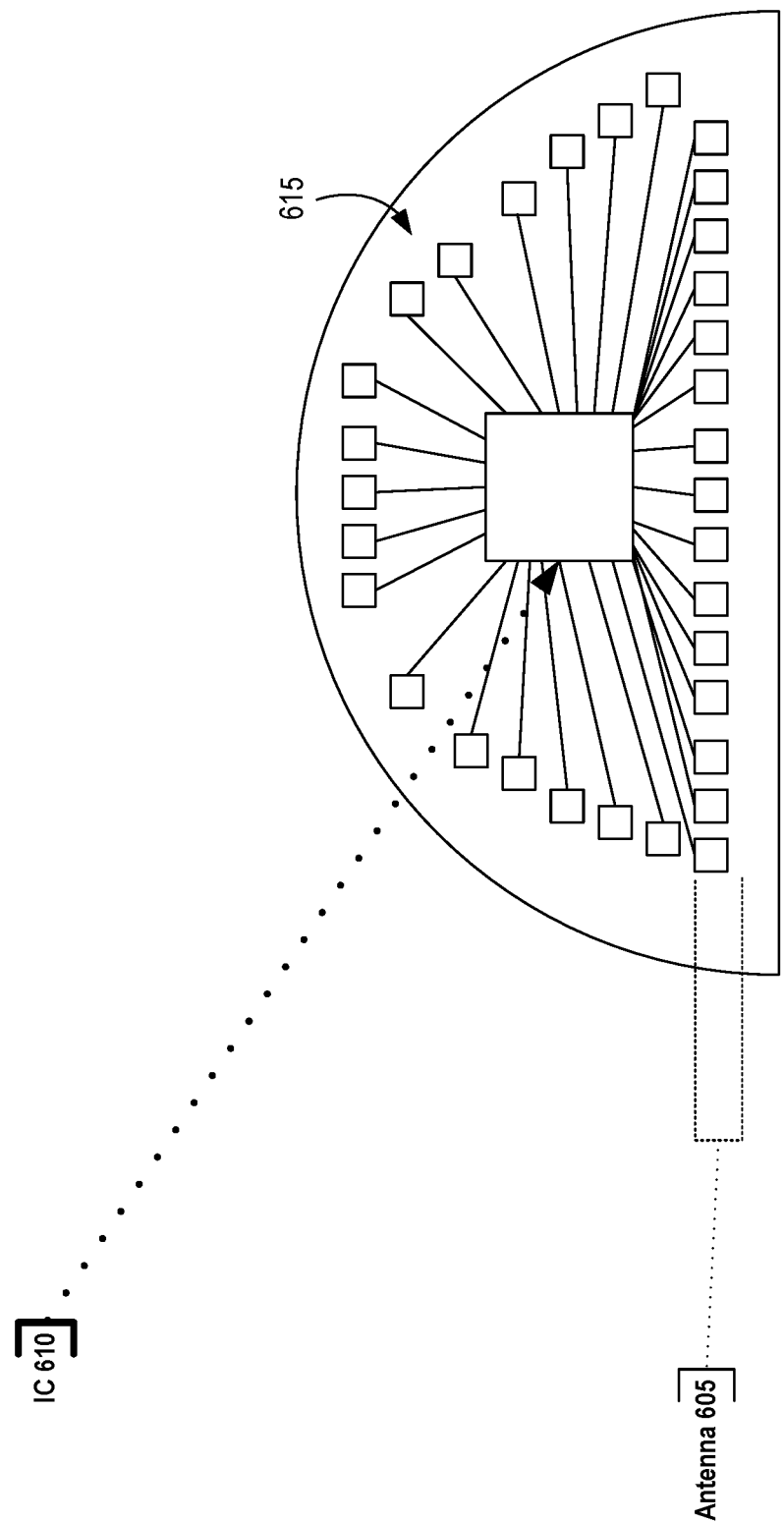
FIG. 6 is an example of a printed circuit board (PCB) for use in a transmitter.

FIG. 6 is an example of a printed circuit board (PCB) 615 for use in a transmitter. The transmitter may be an example of one or more of the transmitters described with reference to FIGS. 1-5. The transmitter includes several PCBs 615, all arranged in a parallel fashion within the transmitter 500. Each PCB 615 includes a controller 610 that controls several antennas 605. The controller 610 may be an application-specific integrated circuit (ASIC), FPGA, microprocessor, baseband processor, or other type of integrated circuit (IC). While shown in a semi-circular pattern in FIG. 6, the antennas 605 may be configured in other arrangements on the PCB 615, such as in a square, in concentric rings, in lines, etc. The PCB 615 may be manufactured using conventional PCB materials (e.g., FR-4).

The antennas 605 are connected to the controller 610 using transmission lines etched or printed on the PCB 615. In some examples, the lengths of the transmission lines are randomized to further diversify transmitted or received signals. The controller 610 detects the phases and amplitudes of beacon signals received by each of the antennas 605. The controller 610 then determines the complex conjugate of the received beacon signals and drives the antennas 605 to emit the complex conjugate as a return or responding signal.

The number of driven antennas 605 in a transmitter may be limited by the surface of area of the PCBs 615 in the transmitter. As further described herein, the number of radiating elements per volume in the transmitter is increased by including free-floating scattering elements between the PCBs 615 in the transmitter. The signals from the antennas 605 driven by the controller 610 are then automatically selectively coupled to scattering elements that are advantageous to recreating the waveform of the beacon. By controlling the antennas 605 on the PCB 615, the free-floating scattering elements are also controlled without having to include wire leads to the scattering elements. In this way, the controllers 610 of each PCB 615 control a three dimensional volume of antennas without directly controlling each radiating element.

Figure 7:
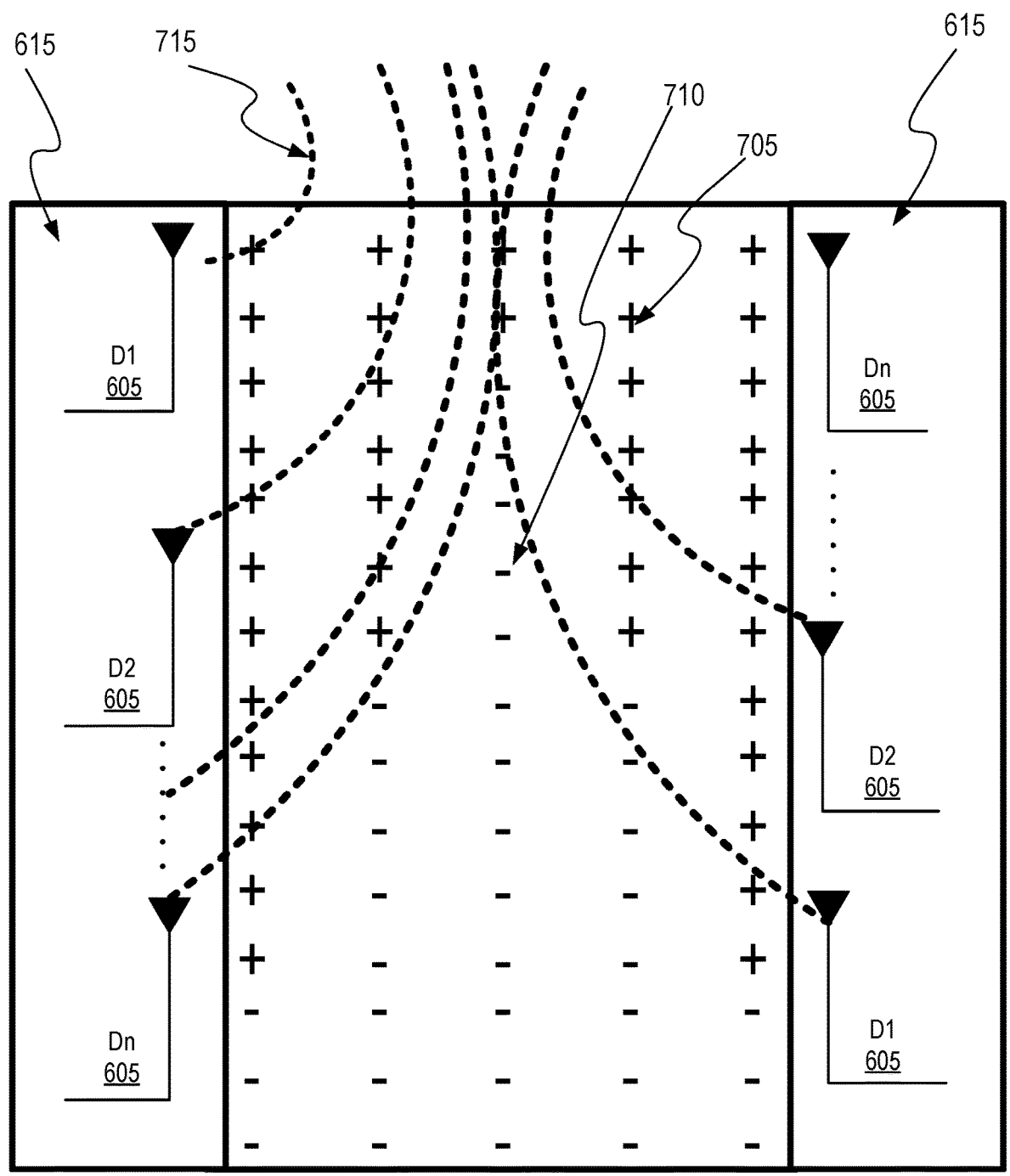
FIG. 7 is an example configuration of multiple PCBs for use in a transmitter, according to an embodiment.

FIG. 7 is an example configuration of multiple PCBs 615 for use in a transmitter, according to an embodiment. The PCBs 615 may be examples of the PCB 615 described in reference to FIG. 6. While two PCBs 615 are shown in FIG. 7 (left and right PCBs 615), it should be understood that a transmitter may contain additional PCB layers arranged in a similar manner. Each PCB 615 includes multiple antennas 605. The antennas 605 may be configured on each PCB 615 in the pattern shown in FIG. 6, or in any other pattern that provides for efficient signal transmission/reception for the particular application and design configuration.

The PCBs 615 are separated by a high refractive index material 705 and a low refractive index material 710. The refractive index of the high refractive index material 705 may be higher relative to the refractive index of the low refractive index material 710. The high refractive index material 705 and the low refractive index material 710 are configured to allow signals 715 to enter/exit the transmitter evenly from the antennas 605 on the PCBs 615. The high refractive index material 705 and the low refractive index material 710 directly in contact with the PCBs 615 serve to raise the effective dielectric constant around each antenna 605, allowing the size of the antennas 605 to be reduced, giving the design of each PCB 615 an extra variable resulting in an optimized design in terms of cost and performance.

Figure 8A:
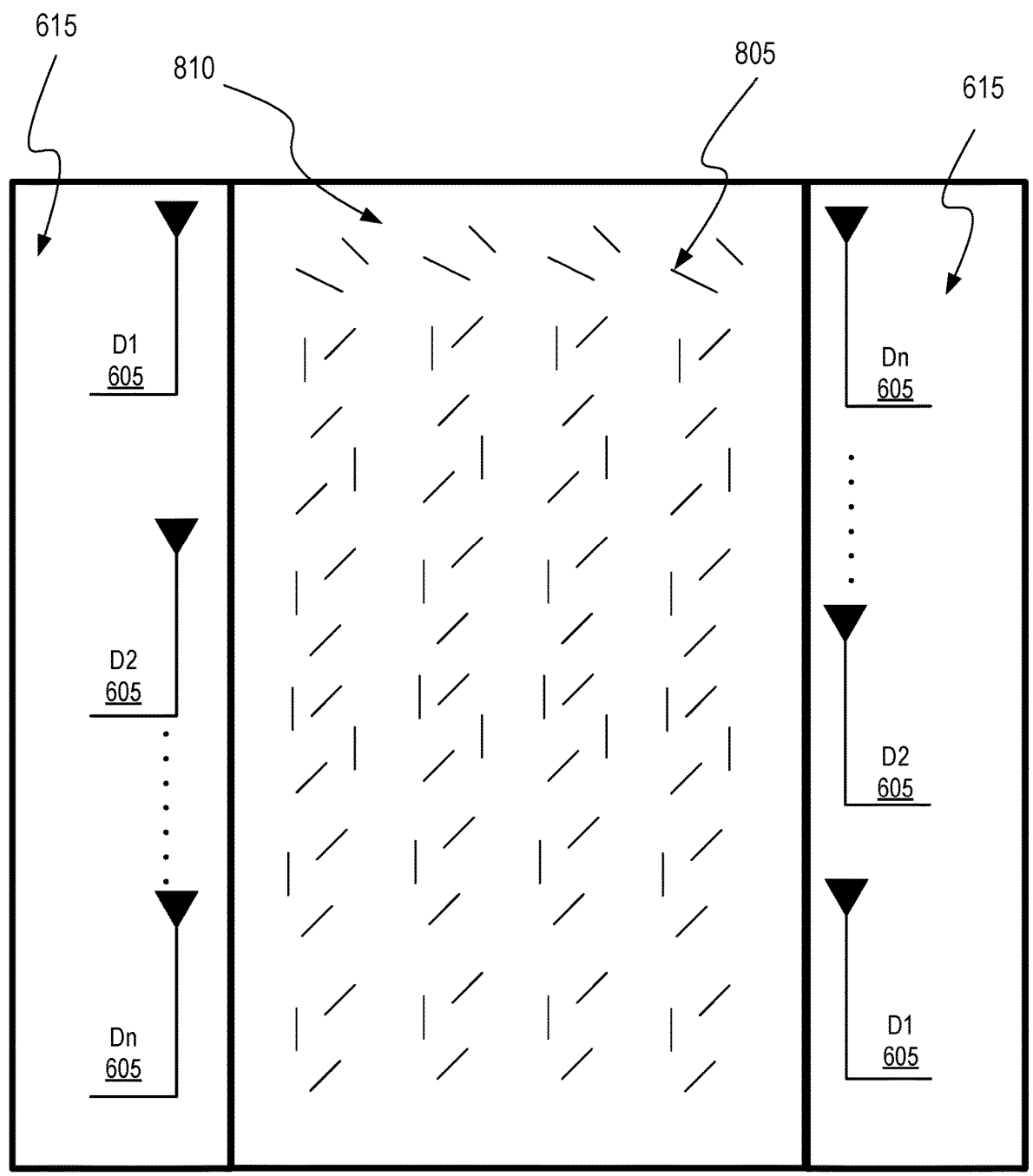
FIG. 8A is another example configuration of multiple PCBs for use in a transmitter, according to an embodiment.

FIG. 8A is another example configuration of multiple PCBs 615 for use in a transmitter, according to an embodiment. The PCBs 615 may be examples of the PCB 615 described in reference to FIG. 6. While two PCBs 615 are shown in FIG. 8A, it should be understood that a transmitter may contain additional PCB layers arranged in a similar manner. Each PCB 615 includes multiple antennas 605. The antennas 605 may be configured on each PCB 615 in the pattern shown in FIG. 6, or in any other pattern that provides for efficient signal transmission/reception.

The PCBs 615 are separated by a dielectric material 810. The shape of the dielectric material 810 may approximately correspond to the shape of the PCBs 615, such that the dielectric material 810 acts as a spacer between PCB layers. Alternatively, the dielectric material 810 may be formed in other three-dimensional shapes between the PCB layers, such as a toroid, a sphere, a cube, etc. The dielectric material 810 directly in contact with the PCBs 615 serves to raise the effective dielectric constant around each antenna 605, allowing the size of the antennas 605 to be reduced without requiring each PCB 615 itself to be made of expensive substrate materials, which provides another variable for optimizing the design of the transmitter in terms of cost and performance.

Multiple, free-floating scattering elements 805 are embedded within the dielectric material 810. In some examples, the scattering elements 805 may be embedded randomly. As described herein, "free-floating" refers to elements that do not have ware leads, but that are still able to be activated by the electrical properties of the transmitter. The scattering elements 805 diversify the signal path from and to the antennas 605 on each PCB 615. Alternatively or in addition, randomized properties of the antennas 605 (such as size, resonant frequency, polarization, transmission line length, location, etc.) may further diversify transmitted or received signals.

The dielectric material 810 may be any low-loss, high-dielectric constant material, such as glass, ceramic, or certain high grade plastics. The low-loss property of the dielectric material 810 means that radio frequency signals entering or exiting the transmitter are not significantly absorbed by the dielectric material 810. The high-dielectric constant property of the dielectric material 810 means that the wavelength of a radio frequency signal inside the dielectric material 810 is shorter than the wavelength of the radio frequency signal outside the dielectric material 810. The dielectric material 810 may be bonded directly to the antennas 605 on the PCBs 615 such that there is continuous dielectric material 810 between the antennas 605 and the scattering elements 805. Other mechanical arrangements for connecting the dielectric material 810 and the PCBs 615 may also be viable, such as dielectric material taking the form of a radome cover attached to one or more PCBs 615.

In some examples, the dielectric material 810 includes a high refractive index material and a low refractive index material as described in reference to FIG. 7. The high refractive index material and the low refractive index material more effectively distribute RF energy to/from all antennas 605 within the transmitter.

In some examples, the scattering elements 805 include highly-conductive elements that act as passive radiators. The size of scattering elements 805 may be similar to the wavelength of the beacon and/or similar to fractions of the wavelength of the beacon. The scattering elements 805 may be arranged within the dielectric material 810 in a specific orientations or in pseudo-random orientations. When certain radio frequency signals (such as the beacon signal or signals emitted by the antennas 605) enter the dielectric material 810, the signals may resonate on the scattering elements 805. In turn, those signals resonating from scattering elements 805 may resonate to other scattering elements 805 and/or resonate out of the dielectric material 810 to the antennas 605 or to a client device being charged. The scattering elements 805 effectively add extra antenna elements to the spaces between the PCBs 615 of a transmitter. In this way, the spaces between the PCBs 615 help to increase the complexity and polarization diversity of signals entering and exiting the transmitter.

In some examples, the scattering elements 805 have a one-to-one correspondence with the antennas 605 on each PCB 615, such that each antenna 605 emits a signal which will resonate with one scattering element 805. Alternatively, the transmitter may include many more scattering elements 805 than antennas 605, or many more antennas 605 than scattering elements 805. In some examples, one or more scattering elements 805 resonate due to signals from a combination of antennas 605. In addition, one or more scattering elements 805 may resonate due to signals emitted by the feeding structures driving one or more antennas 605. The sizes of the antennas 605 and/or scattering elements 805 may be randomized. For example, the sizes may vary randomly between ½₀ lambda to ½ lambda (in the material) to optimize randomization of beacon illumination. The sizes of the antennas 605 may be the same or different from the sizes of the scattering elements 805.

Additionally, the antennas 605 and/or scattering elements 805 may have randomized resonant frequencies. The resonant frequencies are based in part on the mutual coupling between the antennas 605 and/or scattering elements 805. Thus, the randomized sizes and/or locations of the antennas 605 and/or scattering elements 805 aid in randomizing the resonant frequencies. The randomized resonant frequencies allow a larger number of antennas 605 to have approximately the same resonant frequency as the signal being received.

The close proximity between antennas 605 and scattering elements 805 allow the entire volume of the transmitter 101 to be considered a single material. The complex mutual coupling and interactions between each antenna 605 and scattering element 805 may be ignored, and instead the properties of the volume as a whole are utilized. Thus, the overall size of the volume may be modified in order to change properties of the transmitter.

As described in reference to FIGS. 1-2, the transmitter may receive a beacon. When the beacon enters the transmitter, the scattering elements 805 randomize the phase of the beacon, creating a complex waveform with increased diversity within the transmitter. The antennas 605 receive the randomized beacon signals, and the transmitter then determines the complex conjugate of the signals received by each of the antennas 605. The transmitter then emits the complex conjugates from each of the respective antennas 605. The complex conjugates emitted by each of the antennas 605 interact with the scattering elements 805 such that the aggregate of the signals from each antenna 605 and from each scattering element 805 create a waveform exiting the transmitter that is approximately the complex conjugate of the beacon waveform that entered the transmitter. The more evenly distributed energy within the transmitter allows the beacon power to be reduced, which raises the overall end-to-end efficiency of the system.

Figure 8B:
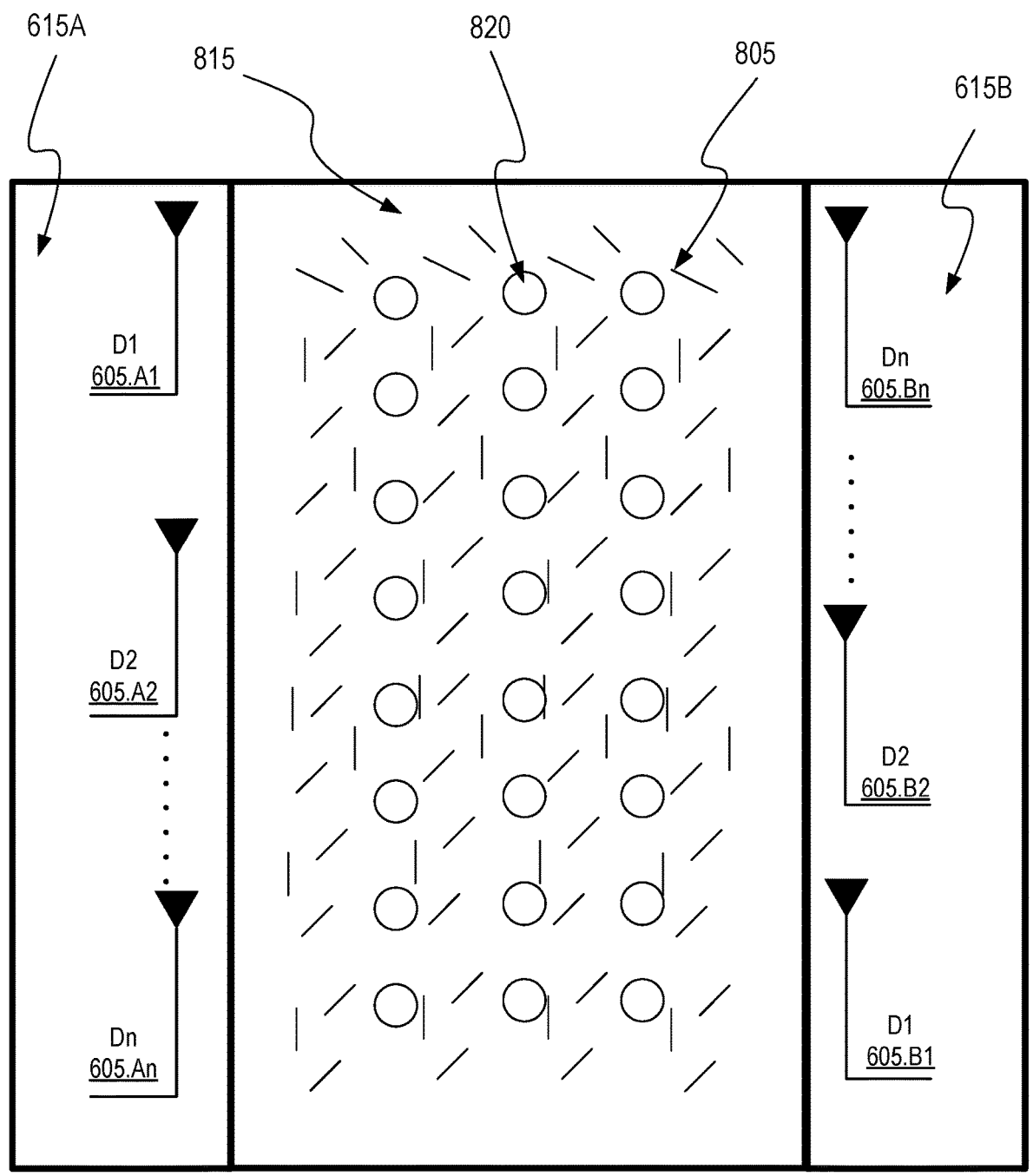
FIG. 8B is an alternative configuration of multiple PCBs for use in a transmitter, according to an embodiment.

FIG. 8B is an alternative configuration of multiple PCBs 615 for use in a transmitter, according to an embodiment. As shown in FIG. 8B, the PCBs 615 are separated by a dielectric material 815 that includes voids 820 and scattering elements 805. (While the voids 820 are shown as circular holes, other voids and geometries are possible, such as slits.) The scattering elements 805 diversify the signal path from and to the antennas 605 on each PCB 615 in a similar manner as described in reference to FIG. 8A. The voids 820 more effectively distribute RF energy to/from all antennas 605 within the transmitter. The sizes and locations of the voids 820 may be randomized to further diversify transmitted or received signals. In some examples, the dielectric material 815 may not include scattering elements 805, and instead may only include voids 820. Alternatively or in addition, randomized properties of the antennas 605 (such as size, resonant frequency, polarization, transmission line length, location, etc.) further diversify the transmitted or received signals.

The voids 820 add randomization to the dielectric material 815. The voids 820 may be air voids of random size and shape that are injected into the dielectric material 815. In this way, the voids 820 create random dielectric variability within the dielectric material 815. In some examples, the voids 820 may be made of other materials having different dielectric constants from the dielectric material 815. For example, the voids 820 may be formed from a high dielectric material, such as mica.

In some examples, the dielectric material 815 includes a high refractive index material and a low refractive index material as described in reference to FIG. 7. The high refractive index material and the low refractive index material further improves the distribution of RF energy to/from the antennas 605 within the transmitter.

Figure 8C:
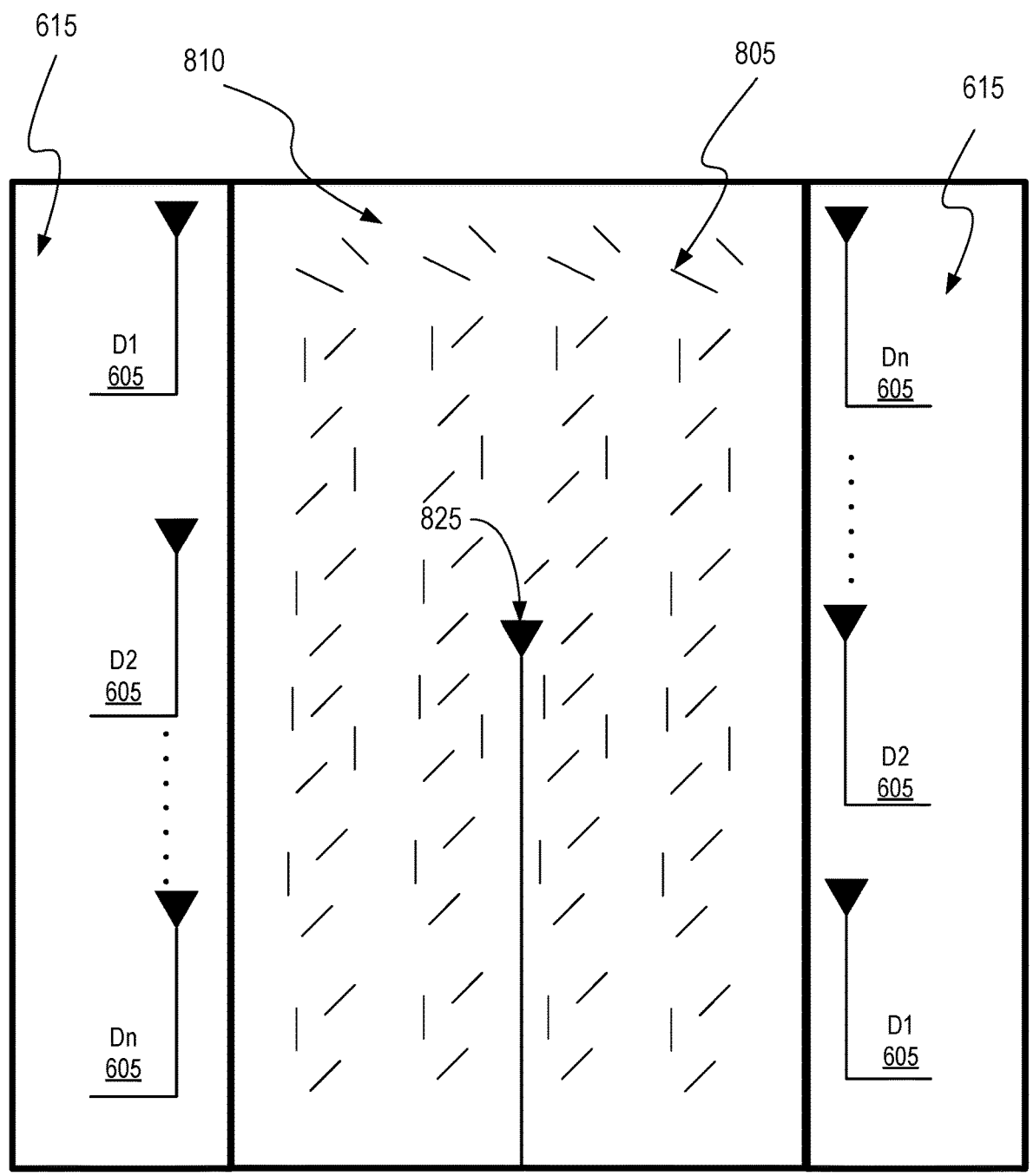
FIG. 8C is an alternative configuration of a transmitter having a high energy source, according to an embodiment.

FIG. 8C is an alternative configuration of multiple PCBs 615 for use in a transmitter, according to an embodiment. As shown in FIG. 8C, the PCBs 615 are separated by a dielectric material 810 that includes scattering elements 805. However, in some embodiments, the dielectric material 810 includes voids 820 (as shown in FIG. 8B) in addition or instead of the scattering elements 805. Alternatively or in addition, randomized properties of the antennas 605 (such as size, resonant frequency, polarization, transmission line length, location, etc.) may diversify transmitted or received signals. Thus, in some embodiments, the dielectric material 810 may include no diversifying elements and instead may rely on the randomizing properties of the antennas 605.

As shown in FIG. 8C, a high energy source 825 is included in the dielectric material 810. When the high energy source 825 is utilized, the antennas 605 may be passive antennas, meaning each antenna 605 is not excited by a discrete power source. Instead, the antennas 605 (and scattering elements 805) are excited by the high energy source 825. The high energy source 825 may be any power source capable of producing a high power signal in the radio frequency spectrum, such as a magnetron.

When a transmitter with a high energy source 825 receives a beacon, the signals received by the antennas 605 include the energy from the high energy source 825, as well as randomized signals from the beacon. The transmitter then determines the complex conjugate of the signals received by each of the antennas 605. However, the complex conjugate also takes into account the energy from the high energy source 825. Then, instead of the transmitter emitting the complex conjugates from each of the respective antennas 605, the transmitter instead tunes the high energy source 825 to emit energy in such a way that the antennas 605 (and, in some embodiments, scattering elements 805) are excited to create a waveform exiting the transmitter that is approximately the complex conjugate of the beacon waveform that entered the transmitter. The transmitter may tune the high energy source 825 by altering the phase of the signals emitted by the high energy source 825.

In some examples, the dielectric material 810 includes a high refractive index material and a low refractive index material as described in reference to FIG. 5. The high refractive index material and the low refractive index material further improve the distribution of RF energy from the high energy source 825 to the antennas 605.

Figure 9:
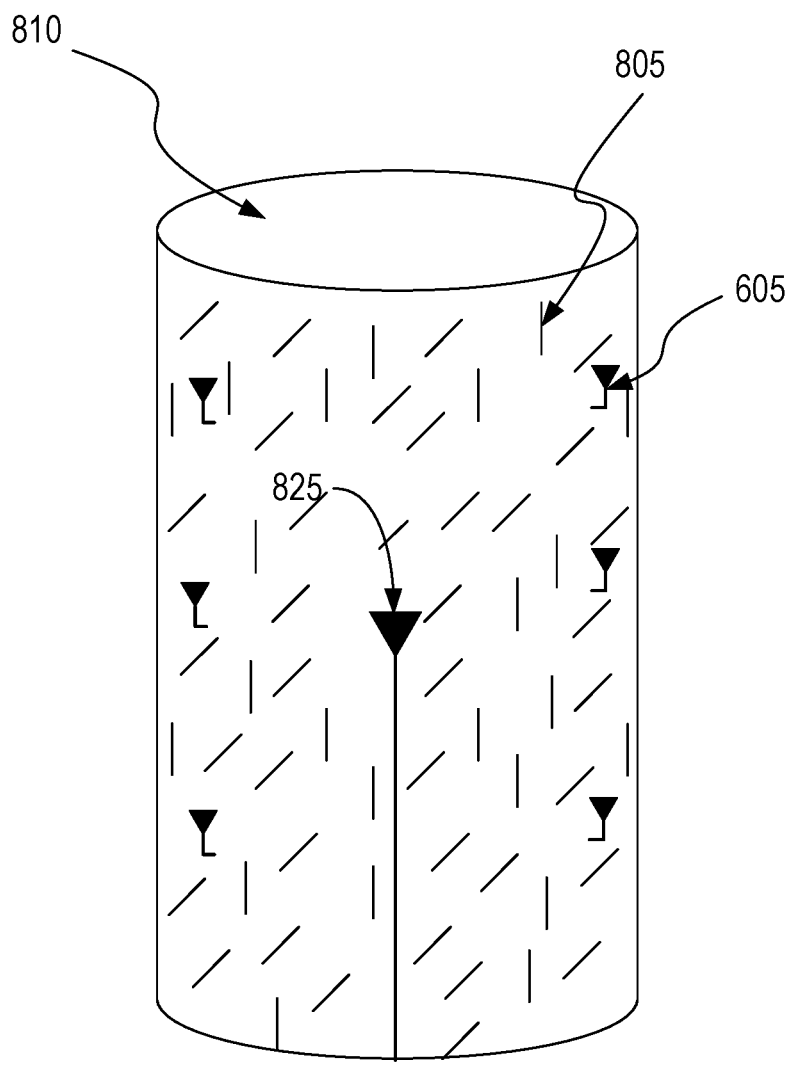
FIG. 9 is an alternative configuration of a transmitter using a high energy source, according to an embodiment.

FIG. 9 is an alternative configuration of a transmitter using a high energy source 825, according to an embodiment. As shown in FIG. 9, the transmitter is in the shape of a cylinder, with the high energy source arranged in the center of the cylinder (though other shapes are also possible). The high energy source 825 may be any power source capable of producing a high power signal in the radio frequency spectrum, such as a magnetron. The high energy source 825 excites antennas 605 around the periphery of the cylinder. The antennas 605 may be passive antennas, meaning each antenna 605 is not excited by a discrete power source.

In some examples, the transmitter also includes scattering elements 805 embedded in a dielectric material 810. Furthermore, in some embodiments, the dielectric material 810 includes voids (as shown in FIG. 8B) in addition or instead of the scattering elements 805. Alternatively or in addition, randomized properties of the antennas 605 (such as size, resonant frequency, polarization, transmission line length, location, etc.) may diversify transmitted or received signals.

In some examples, the dielectric material 810 includes a high refractive index material and a low refractive index material as described in reference to FIG. 7. The high refractive index material and the low refractive index material further improve the distribution of RF energy from the high energy source 825 to the antennas 605.

Figure 10:
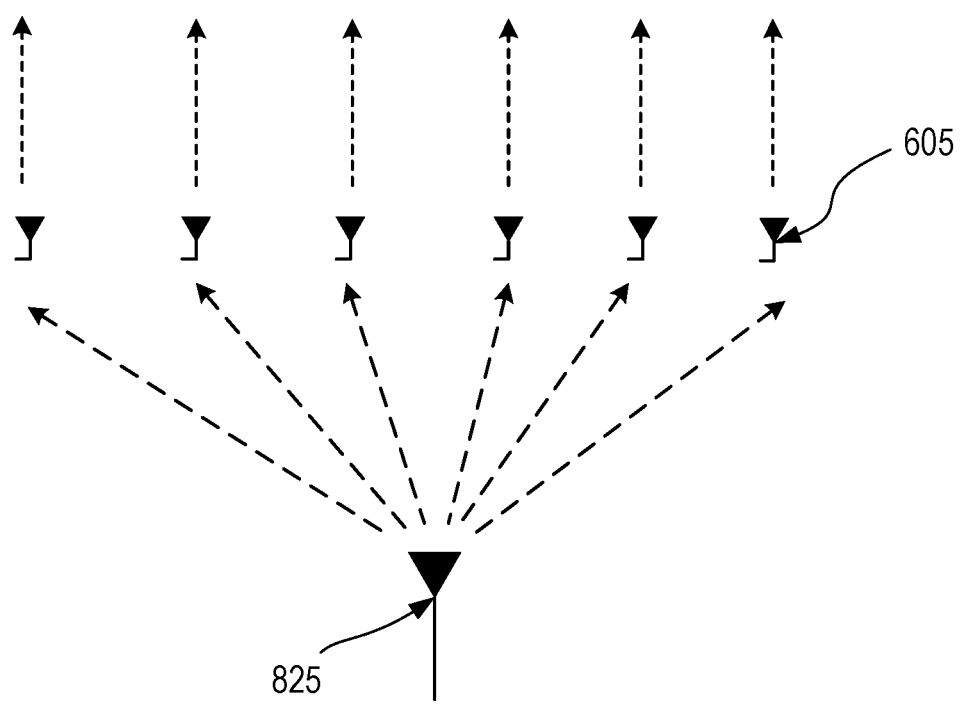
FIG. 10 illustrates the operation of the high energy source 825, according to an embodiment.

FIG. 10 illustrates the operation of the high energy source 825, according to an embodiment. As shown in FIG. 10, the antennas 605 are illuminated or supplied with a power feed from the high energy source 825. The antennas 605 then modify the phase and amplitude of the received power feed, and emit the desired signals from the transmitter (e.g., the waveform of the beacon).

Figure 11:
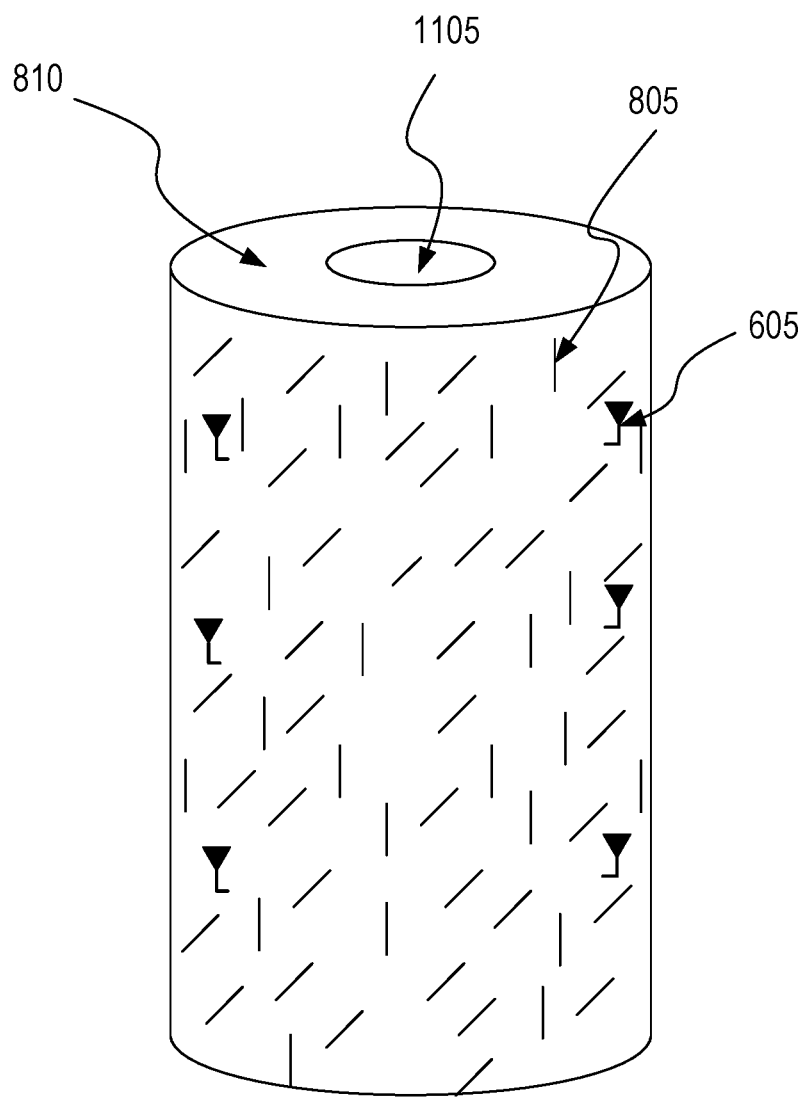
FIG. 11 is an alternative configuration of a cylindrical transmitter, according to an embodiment.

FIG. 11 is an alternative configuration of a cylindrical transmitter, according to an embodiment. As shown in FIG. 11, the cylinder is annular, with a hole 1105 through the center. The annular transmitter may include antennas 605 around the periphery. In some examples, the annular transmitter also includes a high energy source for exciting the antennas 605, as described in reference to FIGS. 8C, 9, and 10. The antennas 605 may be passive antennas or active antennas.

In some examples, the annular transmitter also includes scattering elements 805 embedded in a dielectric material 810. Furthermore, in some embodiments, the dielectric material 810 includes voids (as shown in FIG. 8B) in addition or instead of the scattering elements 805. Alternatively or in addition, randomized properties of the antennas 605 (such as size, resonant frequency, polarization, transmission line length, location, etc.) may diversify transmitted or received signals.

In some examples, the dielectric material 810 includes a high refractive index material and a low refractive index material as described in reference to FIG. 5. The high refractive index material and the low refractive index material further improve the distribution of RF energy from the high energy source 825 to the antennas 605.

Figure 12:
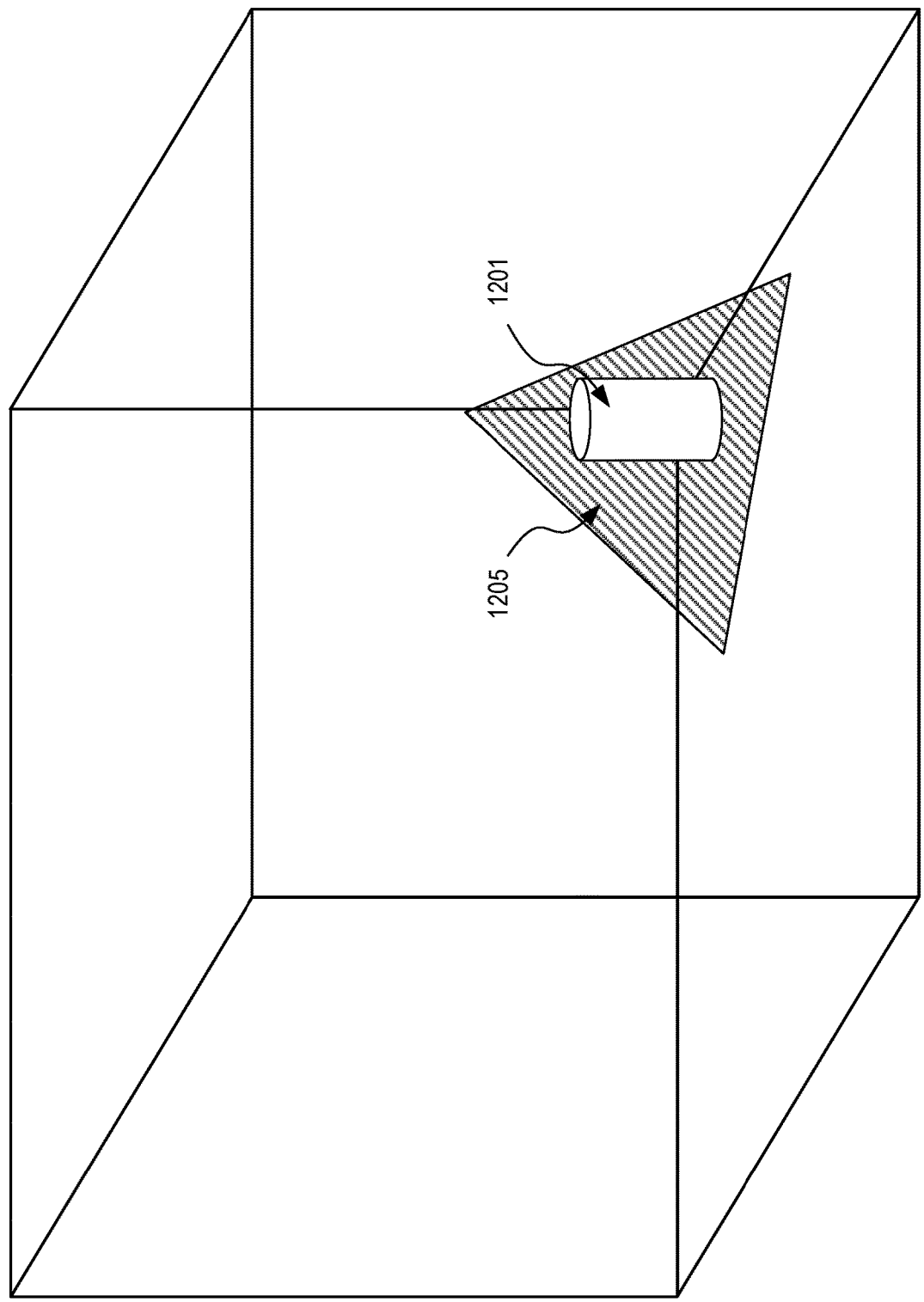
FIG. 12 illustrates an environment (specifically optimized for wireless power delivery) containing a transmitter, according to an embodiment.

FIG. 12 illustrates an environment containing a transmitter 1201, according to an embodiment. The transmitter 1201 may be any one of the transmitters described in reference to FIGS. 1-11, and may include different combinations of features described in reference to FIGS. 1-11. For example, the transmitter 1201 may have an annular shape, with antennas around the periphery of the transmitter 1201. In some examples, the transmitter 1201 may emit signals in a symmetrical or omnidirectional pattern. A reflective material 1205 is placed around a portion of the transmitter 1201 to enhance signal transmission in a particular direction (generally opposite to the reflective material). As shown in the schematic example of FIG. 12, the transmitter 1201 may be placed in a corner of a rectangular room, and reflective material 1205 placed in the corner, behind the transmitter, to thereby direct energy transmitted by the transmitter to be directed away from the corner and into the room. By enhancing signal transmission in a particular direction, the transmitter 1201 provides increased wireless power delivery to a client device. The reflective material 1205 may be designed to reflect signals in a frequency spectrum selected for wireless charging, and to pass signals in other frequency spectrums not used for wireless charging. The reflective material 1205 may be configured in a variety of shapes. By way of example and not limiting, the reflective material 1205 may have a parabolic shape, similar to an antenna dish.

Figure 13:
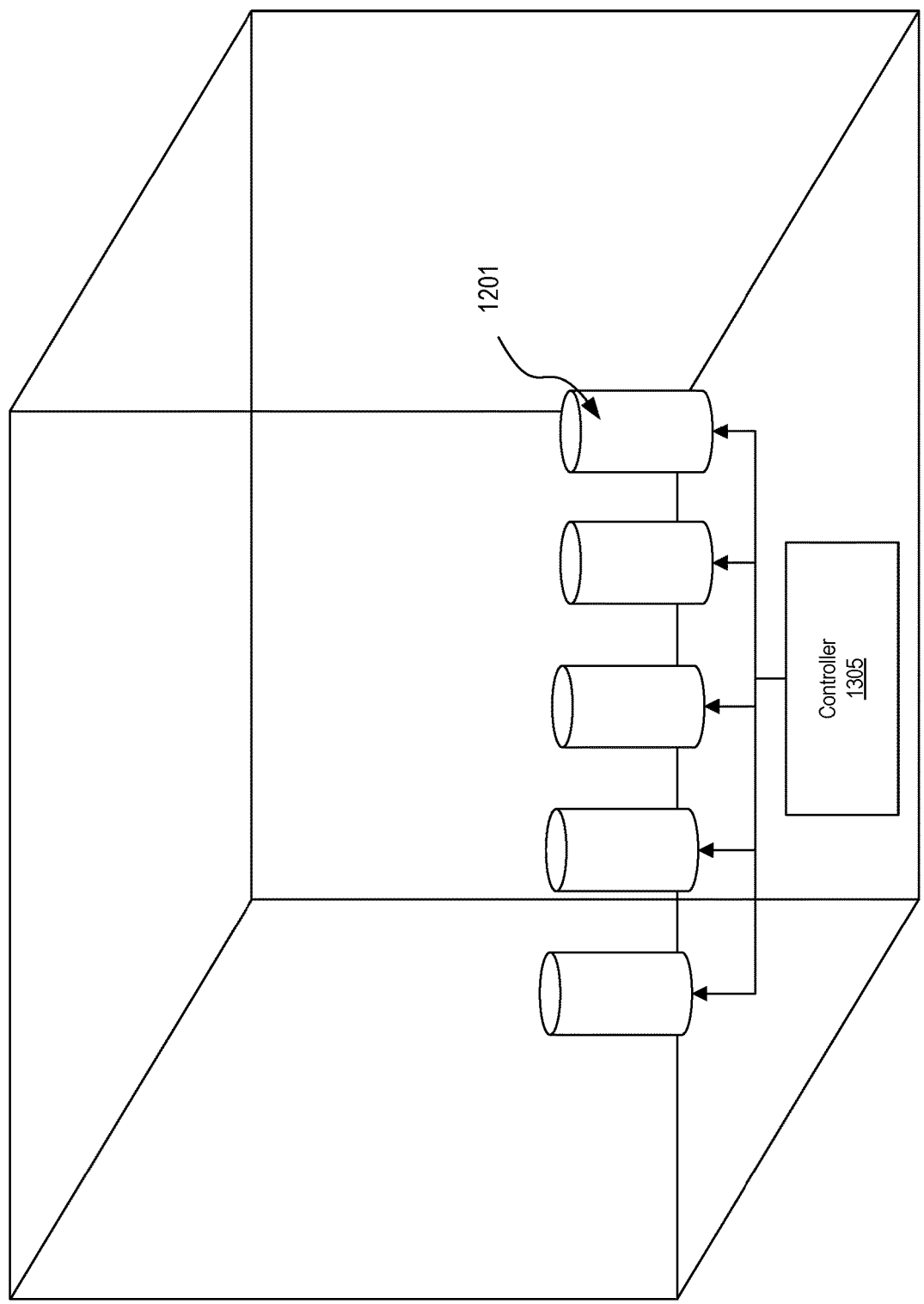
FIG. 13 illustrates another environment optimized for wireless power delivery and containing multiple transmitters, according to an embodiment.

FIG. 13 illustrates another environment optimized for wireless power delivery and containing multiple transmitters 1201. The transmitters 1201 may be any one of the transmitters described in reference to FIGS. 1-12, and may include different combinations of features described in reference to FIGS. 1-12. For example, the transmitters 1201 may each have an annular shape, with antennas around the periphery of the transmitter 1201. Alternatively, the transmitters 1201 may each include a single PCB with many antennas, such as the PCB 615 shown in FIG. 6.

The many different transmitters 1201 are placed at different locations inside an environment to create different channels of wireless charging to a client device. Thus, one or more transmitters 1201 may provide signals on channel A to clients tuned to channel A, while other transmitters transmit and other clients receive on channel B, and so on. The transmitters 1201 may either operate individually or be connected to a controller 1305, which manages the operation of each of the transmitters 1201 such that they provide more efficient wireless power delivery.

FIG. 14 is an example matrix illustrating the correspondence between driven (D) and radiating (A) elements in a transmitter. The driven elements are represented by the rows of the matrix, and the radiating elements are represented by the columns of the matrix. In the basic configuration shown in FIG. 14, each element is driven individually and does not interfere with other emitting elements. Driving driven element 1 causes only radiating element 1 to be radiating; driving driven element 2 causes only radiating element 2 to be radiating and so on. This basic configuration may correspond to a conventional transmitter where each antenna is individually driven.

FIG. 15 is another example matrix illustrating the correspondence between driven and radiating elements in a transmitter, according to an embodiment. The driven elements are represented by the rows of the matrix, and the radiating elements are represented by the columns of the matrix. In the complex configuration shown in FIG. 15, the phase signal emitted by each element affects the phase signal of each Other element. Driving driven element 1 causes many other emitting elements to activate at different phases; driving driven element 2 causes many other emitting elements to activate at different phases and so on. This complex configuration may correspond to a transmitter having driven antennas and passive scattering elements, where the driven antennas cause the passive scattering elements to emit signals.

Example Computer Systems

Figure 16:
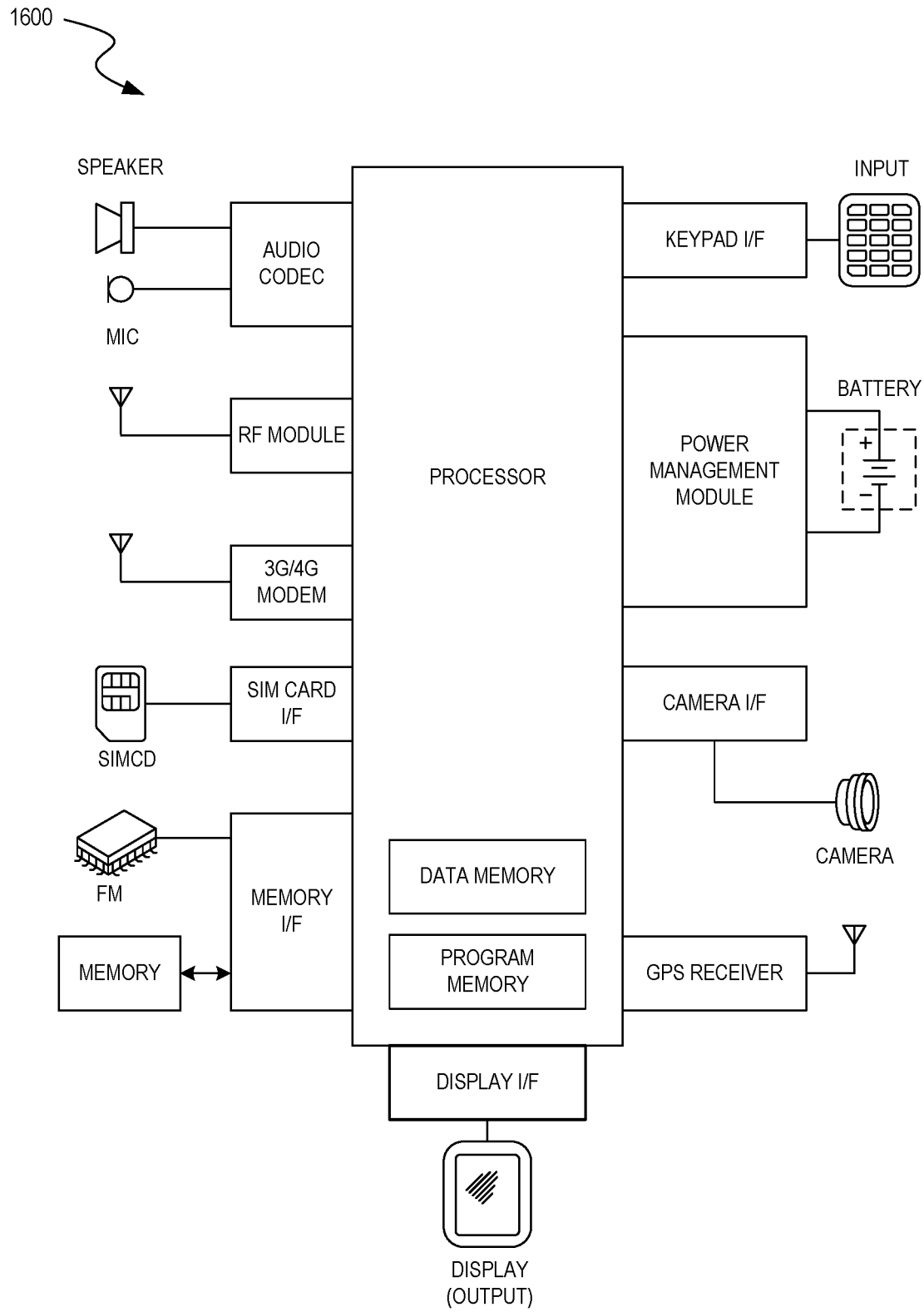
FIG. 16 is a block diagram illustrating example components of a representative client in the form of a mobile (or smart) phone or tablet computer device.

FIG. 16 depicts a block diagram illustrating example components of a representative client (e.g., mobile device, tablet computer, category controller, maintenance controller, etc.) 1600 in the form of a mobile (or smart) phone or tablet computer device. Various interfaces and modules are shop with reference to FIG. 8, however, the mobile device or tablet computer does not require all of modules or functions for performing the functionality described herein, it is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee™ radios and RFID transceivers, along with antennas, can populate the Printed Circuit Board.

Figure 17:
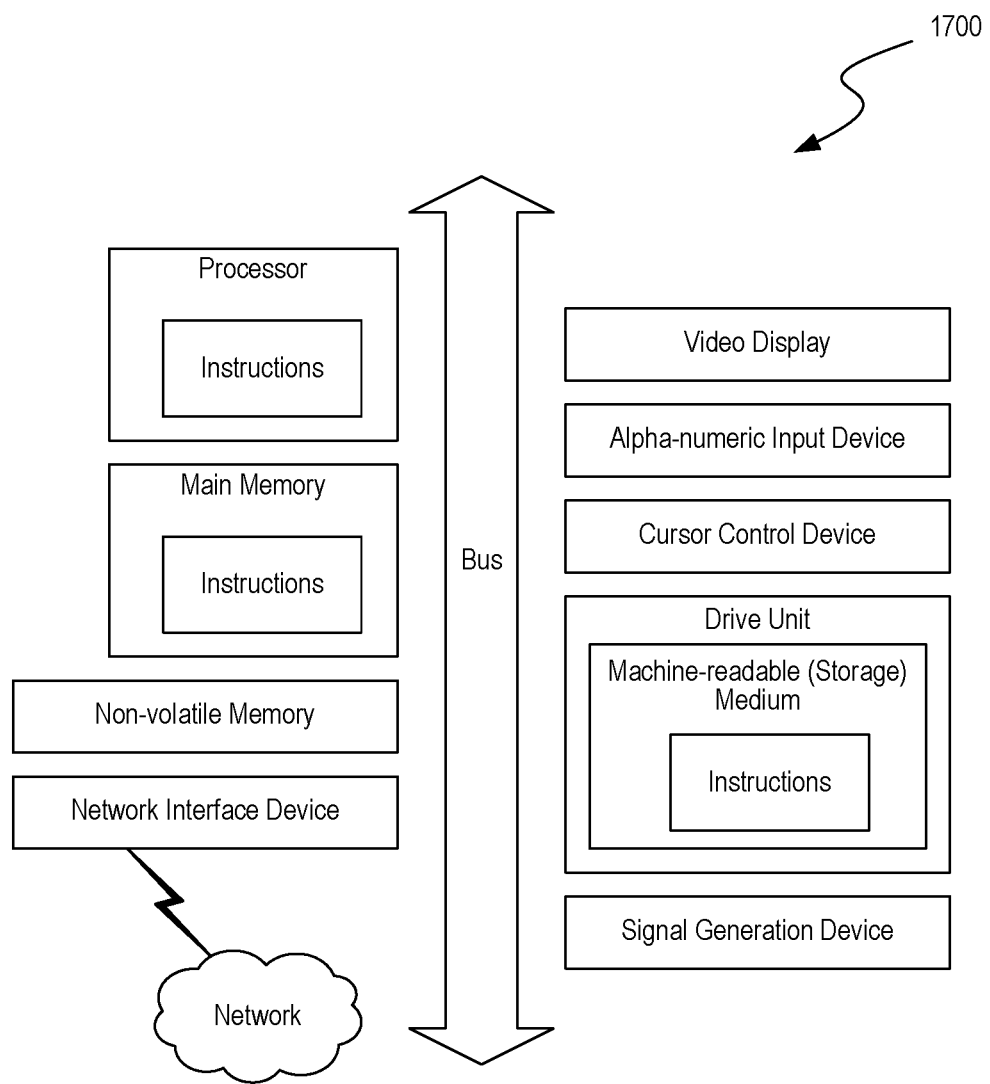
FIG. 17 is a diagrammatic representation of a machine in the example form of a computer system within which a set of instructions, for causing the machine to perform any one or more of the methodologies discussed herein, may be executed.

FIG. 17 depicts a diagrammatic representation of a machine, in the example form, of a computer system 1700 within which a set of instructions, for causing the machine to perform any one or more of the methodologies discussed herein, may be executed. The computer system 1700 can be representative of any computer system, server, etc., described herein.

In the example of FIG. 17, the computer system 1700 includes a processor (CPU), memory, non-volatile memory, and an interface device. Various common components (e.g., cache memory) are omitted for illustrative simplicity. The computer system 1700 is intended to illustrate a hardware device on which any of the components depicted in the example of FIG. 1 (and any other components described in this specification) can be implemented. The computer system 1700 can be of any applicable known or convenient type. The components of the computer system 1700 can be coupled together via a bus or through some other known or convenient device.

The processor may be, for example, a conventional microprocessor such as an Intel x86-based microprocessor. One of skill in the relevant art will recognize that the terms "machine-readable (storage) medium" or "computer-readable (storage) medium" includes any type of device that is accessible by the processor.

The memory is coupled to the processor by, for example, a bus. The memory can include, by way of example but not limitation, random access memory (RAM), such as dynamic RAM (DRAM), static RAM (SRAM), flash RAM, etc. The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 1700. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a liquid crystal display (LCD), OLED, or some other applicable known or convenient display device. For simplicity, it is assumed that controllers of any devices not depicted reside in the interface.

In operation, the computer system 1700 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result or output. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description herein. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment).

The machine may be a server computer, a client computer, a personal computer (PC), a tablet PC, a laptop computer, a set-top box (STB), a personal digital assistant (PDA), a cellular telephone, a smart phone a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the Above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways.

Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A transmitter device, comprising:
   multiple antennas;
   a dielectric material in proximity to the multiple antennas, the dielectric material having disposed therein a non-layered distribution of a high refractive index material and a low refractive index material; and
   multiple scattering elements embedded in the dielectric material,
      wherein one or more of the multiple scattering elements are configured to increase a number of radiating elements per volume in the transmitter device by creating complex waveforms with increased diversity when excited by one or more signals emitted by the multiple antennas.

2. The transmitter device of claim 1, wherein the transmitter device is configured to transmit, over at least one of the multiple antennas, a power signal to supply power to a client device.

3. The transmitter device of claim 1, further comprising: multiple voids in the dielectric material.

4. The transmitter device of claim 1, further comprising a reflective element to reflect and direct wireless power, transmitted by the multiple antennas, toward a desired location in which client devices to receive power may be located.

5. The transmitter device of claim 1, wherein the multiple scattering elements are free-floating in the dielectric material.

6. The transmitter device of claim 1, wherein the multiple scattering elements are arranged in pseudo-random orientations in the dielectric material.

7. The transmitter device of claim 1, wherein the multiple scattering elements have randomized sizes between $\frac{1}{20}$ lambda to $\frac{1}{2}$ lambda in the dielectric material.

8. The transmitter device of claim 1, wherein the multiple antennas are components of at least one printed circuit board (PCB), and wherein the dielectric material is bonded to the at least one PCB.

9. The transmitter device of claim 1 wherein the multiple antennas, dielectric material, and multiple scattering elements are divided into at least first and second sets of antennas, dielectric materials, and scattering elements, wherein the first and second sets are contained within separate first and second housings, respectively, and wherein the first and second sets are configured to transmit signals on first and second channels, respectively.

10. The transmitter device of claim 1, wherein the multiple antennas are components of two or more printed circuit boards (PCBs), and wherein the dielectric material is arranged between the two or more PCBs.

11. The transmitter device of claim 1, wherein the dielectric material is disposed in direct contact with one or more of the multiple antennas.

12. The transmitter device of claim 1, wherein each of the multiple antennas include at least one randomizing property, and wherein the at least one randomizing property comprises size, resonant frequency, polarization, transmission line length, location, or a combination thereof.

13. The transmitter device of claim 1, wherein each of the multiple scattering elements comprise a conductive material.

14. The transmitter device of claim 1, wherein the dielectric material comprises a low-loss, high-dielectric constant material.

15. The transmitter device of claim 1, further comprising: a high energy source in proximity to the multiple antennas, wherein the high energy source is configured to excite one or more of the multiple antennas.

16. A system, comprising:
means for emitting multiple signals from multiple antennas; and
means for exciting one or more of multiple scattering elements with the multiple signals,
wherein the multiple scattering elements are embedded in a dielectric material proximate to the multiple antennas, and
wherein the dielectric material comprises a high refractive index material and a low refractive index material disposed in a non-layered pattern.

17. The system of claim 16, wherein the multiple scattering elements are free-floating in the dielectric material.

18. The system of claim 16, wherein the multiple scattering elements are arranged in pseudo-random orientations in the dielectric material.

19. The system of claim 16, wherein the multiple scattering elements have randomized sizes between $\frac{1}{20}$ lambda to $\frac{1}{2}$ lambda in the dielectric material.

20. A method, comprising:
emitting a high energy signal from a high energy source;
exciting one or more of multiple antennas with the high energy signal,
wherein the high energy source is in proximity to the multiple antennas, and
wherein the multiple antennas are contained within at least one transmitter unit;
emitting multiple signals from one or more of the multiple antennas; and
exciting one or more of multiple scattering elements with at least one of the high energy signal or the multiple signals,
wherein the multiple scattering elements are embedded in a dielectric material in proximity to the multiple antennas, the dielectric material having disposed therein a non-layered distribution of a high refractive index material and a low refractive index material.

* * * * *